(12) United States Patent
Nakajima et al.

(10) Patent No.: US 7,380,015 B1
(45) Date of Patent: May 27, 2008

(54) APPARATUS AND METHOD FOR COMPRESSION-TRANSMITTING AND DECODING PICTURE INFORMATION AND STORAGE MEDIUM STORED ITS CONTROL PROGRAMS

(75) Inventors: Yasuyuki Nakajima, Saitama (JP); Hiromasa Yanagihara, Saitama (JP); Akio Yoneyama, Tokyo (JP); Masaru Sugano, Tokyo (JP)

(73) Assignee: KDD Corporation, Tokyo (JP)

( * ) Notice: Subject to any disclaimer, the term of this patent is extended or adjusted under 35 U.S.C. 154(b) by 964 days.

(21) Appl. No.: 09/657,368

(22) Filed: Sep. 7, 2000

(30) Foreign Application Priority Data

Sep. 10, 1999 (JP) ................... 11-257553
Sep. 20, 1999 (JP) ................... 11-265780

(51) Int. Cl.
*G06F 15/16* (2006.01)
*G06F 11/06* (2006.01)
(52) U.S. Cl. .................. 709/232; 709/231; 370/232
(58) Field of Classification Search ................ 709/232, 709/231, 239, 233, 216, 248; 370/232, 231
See application file for complete search history.

(56) References Cited

U.S. PATENT DOCUMENTS

| | | | | |
|---|---|---|---|---|
| 5,594,859 | A * | 1/1997 | Palmer et al. | 345/756 |
| 5,923,655 | A * | 7/1999 | Veschi et al. | 370/394 |
| 5,956,729 | A * | 9/1999 | Goetz et al. | 707/104.1 |
| 6,014,694 | A * | 1/2000 | Aharoni et al. | 709/219 |
| 6,014,706 | A * | 1/2000 | Cannon et al. | 709/231 |
| 6,490,705 | B1 * | 12/2002 | Boyce | 714/776 |
| 6,701,372 | B2 * | 3/2004 | Yano et al. | 709/232 |

FOREIGN PATENT DOCUMENTS

| | | |
|---|---|---|
| JP | 07-245729 | 9/1995 |
| JP | 08-051626 | 2/1996 |
| JP | 09-200704 | 7/1997 |
| JP | 09-200772 | 7/1997 |
| WO | WO 98/33320 | * 7/1998 |

OTHER PUBLICATIONS

Milovanic et al. MPEG-4 Video Transmission over the Internet IEEE pp. 309-312, Oct. 1999.*
Herpel Elementary Stream Management in MPEG-4 IEEE pp. 315-324, Mar. 1999.*
Wu et al. MPEG-4 Compressed Video Ove rthe Internet pp. 327-331, 1999.*
Tomohiro Miyazaki et al."A Study on Video Transmission for IP Network", pp. 1-8. The Institute of Electronics, Information and Communication Engineers; Technical Report of IEICE of S99-36, IE99-45 (Sep. 1999), Translation of Abstract Only.

* cited by examiner

*Primary Examiner*—Larry D. Donaghue
(74) *Attorney, Agent, or Firm*—Westerman, Hattori, Daniels & Adrian, LLP.

(57) ABSTRACT

The present invention provides a real-time live picture information compression-transmission apparatus and method using a connection-less type protocol for a computer network. The compression-transmission apparatus is constituted to divide frame data output from a real-time encoder compressing live picture information into packets, and to transmit the live picture information in a real time manner according to the connection-less type protocol while suppressing burst transmission by conducting transmission control. The present invention also provides a compressed video data decoding apparatus capable of reducing compressed video decoding processing load without deteriorating picture quality and decreasing the number of played back picture planes when playing back a picture.

8 Claims, 29 Drawing Sheets

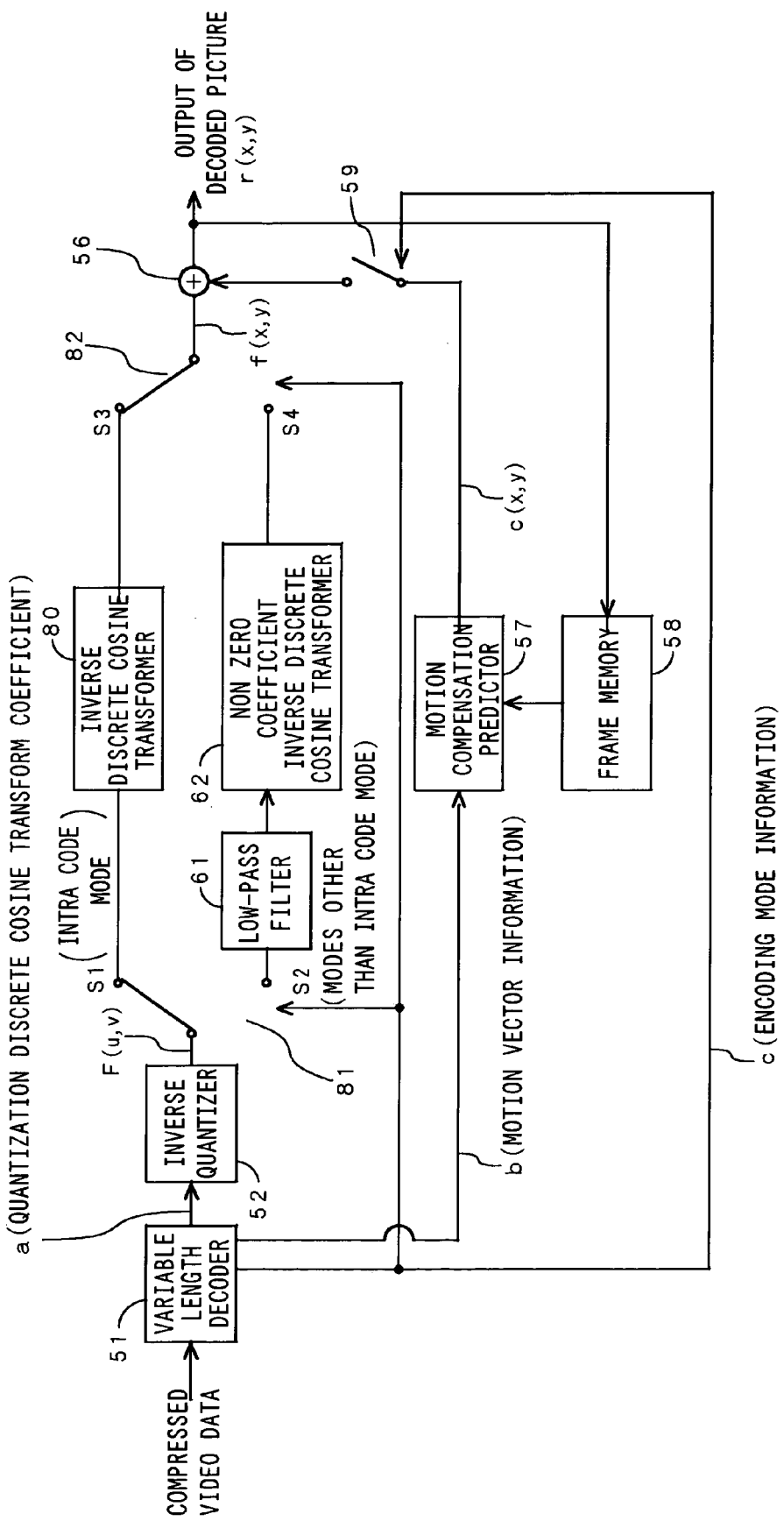

Fig. 23

$$F'(u,v) = \frac{F(u,v)}{\left(2^{p_1/2}\cos\frac{u\pi}{4N/2} \cdot \cos\frac{u\pi}{4N/2^2} \cdots \cos\frac{u\pi}{4N/2^{p_1}}\right)\left(2^{p_2/2}\cos\frac{v\pi}{4N/2} \cdot \cos\frac{v\pi}{4N/2^2} \cdots \cos\frac{v\pi}{4N/2^{p_2}}\right)} \quad \cdots(15)$$

$$f(x,y) = \frac{2}{N}\sum_{u=0}^{b_1-1}\sum_{v=0}^{b_2-1} C(u)C(v)F(u,v)\cos\frac{(2x+1)u\pi}{2N}\cos\frac{(2y+1)v\pi}{2N} \quad \cdots(29)$$

$$C(p) = \begin{cases} 1/\sqrt{2} & p=0 \\ 1 & p \neq 0 \end{cases} \quad \cdots(30)$$

$$C_a^b = \cos\left(\frac{a\pi}{b}\right) \quad \cdots(31)$$

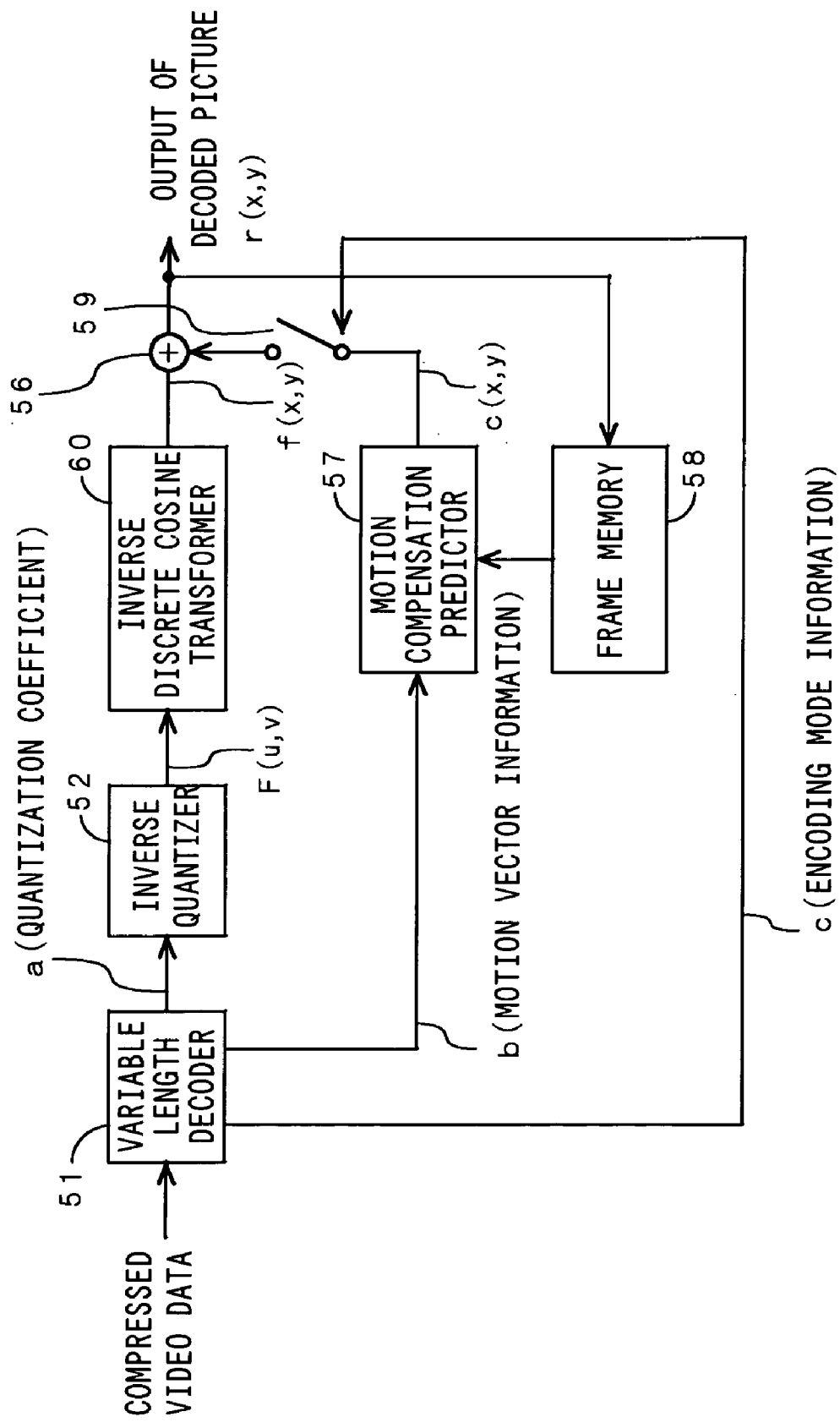

APPARATUS AND METHOD FOR COMPRESSION-TRANSMITTING AND DECODING PICTURE INFORMATION AND STORAGE MEDIUM STORED ITS CONTROL PROGRAMS

BACKGROUND OF THE INVENTION

1. Field of the Invention

The present invention relates to an apparatus and a method for compression-transmitting picture information such as live picture information, a decoding apparatus for reducing compressed video data decoding processing load and decoding picture information, and a storage medium stored a control program for controlling the real time compression-transmission of picture information and decoding the picture information.

2. Description of the Related Art

To compress picture information such as live picture information in a real time manner compression and to transmit the picture information on a computer network, there are roughly two conventional methods, i.e., a direct transmission method and an FIFO (First-In-First-Out) method.

In case of the direct transmission method, bit strings having different sizes according to frames outputted by a live encoder are outputted to a network as they are. In that case, even if the transmission bit rate of data transmitted for one second is constant, a momentary transmission bit rate greatly varies depending on properties such as encode modes and the motions of pictures. Due to this, burst data temporarily occupies a network band, with the result that packet collision and packet loss tend to occur and transmission efficiency thereby deteriorates. If there is little room for an empty band of the network relative to an average stream transmission band, in particular, the deterioration of transmission efficiency is more conspicuous.

The direct transmission method will be described in more detail with reference to FIG. 25. A picture signal inputted from a camera 10 is encoded in frame units (e.g., at intervals of about 1/30 seconds) by a real time encoder 11 which encodes data in real-time, and written into a frame buffer 12. Next, frame data having difference sizes according to frames is outputted altogether to a network 16 at the best efforts by a network transmission section 15$a$, and fed to clients 17$l$ to 17$m$ connected to the network. In that case, the momentary transmission bit rate of the K-th frame (R no-control-K) is a gradient of a waveform W10 shown in FIG. 26 and obtained from the following formula (1):

$$R\text{ no-control-}K = BK/TSK[\text{bit/sec}] > RS \qquad (1)$$

Here, TSK: transmission time for transmitting K-th frame data to network,

BK: quantity of the K-th frame data accumulated in frame buffer, and

R no-control–K: network transmission bit rate for K-the frame.

Since this momentary transmission bit rate (R no-control-K) is far higher than an average bit stream rate (RS), chance of transmitting burst packet data is increased, resulting in the deterioration of transmission efficiency. In FIG. 26, TFK is a frame distance between the K-th frame and the (K+1)th frame and TWK is a time for which the encoder 11 writes the K-th frame data into the frame buffer 12.

In case of the FIFO method, bit strings having different sizes according to frames outputted from the live encoder are sequentially written into an FIFO and stream data read from the FIFO at a constant speed using a process different from the encoder process is outputted to the network. The FIFO method will be described in more detail with reference to FIG. 27. A picture signal inputted from the camera 10 is encoded in frame units (e.g., at intervals of about 1/30 seconds) by a real time encoder 11 and sequentially written into an FIFO 12$a$. Next, the data read from the FIFO 12$a$ at a constant speed by a network transmission section 15$a$ is outputted to a network 16 at a constant rate and fed to clients 17$l$ to 17$m$ connected to the network. A momentary transmission bit rate (RFIFO) in that case is a gradient of a waveform W11 shown in FIG. 28 and equal to an average stream bit rate (RS) as shown in a formula (2) below:

$$RFIFO = RS[\text{bit/sec}] \qquad (2)$$

Here, RS: average stream bit rate; and

RFIFO: transmission bit rate for transmission to network.

Due to this, it is possible to avoid the burst transmission of packets and to transmit data efficiently.

However, if the above-described picture information transmission means is used, an FIFO requiring overflow and underflow control is necessary and it is also necessary to start another process for network output, thereby disadvantageously complicating packaging compared with the direct transmission method.

Next, a conventional decoding apparatus for decoding a compressed video data is shown in FIG. 29. In FIG. 29, compressed video data is inputted into a variable length decoder 51 and subjected to variable length decoding. Decoded quantization coefficients a, i.e., quantization discrete cosine transform coefficients are inputted into an inverse quantizer 52, and decoded motion vector information b is inputted into a motion compensation predictor 57. The quantization coefficients a are dequantized by the inverse quantizer 52 and discrete cosine transform coefficients F(u, v) are inputted into an inverse discrete cosine transformer 60. The motion compensation predictor 57 extracts predictive picture data for using prediction from the pictures stored in a frame memory 58 using the motion vector information b.

Encode mode information c decoded by the variable length decoder 51 controls switching means 59. If the encode mode is an intra-plane encode mode, the switching means 59 is turned off and nothing is added to outputs f(x, y) from the inverse discrete cosine transformer 60 by an adder 56. Therefore, the outputs are outputted as decoded picture outputs r(x, y) as they are and also stored in the frame memory 58.

On the other hand, if the encode mode is a mode other than the intra-plane encode mode, the switching means 59 is turned on, the outputs f(x, y) from the inverse discrete cosine transformer 60 are added to motion compensation predictive pictures c(x, y) by the adder 56 and the outputs are outputted as decoded picture outputs r(x, y) and also stored in the frame memory 58.

In a compressed video data decoding processing, inverse discrete cosine transform has the largest processing load. Due to this, such a high-speed inverse discrete cosine transform algorithm as described in B. G. Lee, "A new algorithm to compute the discrete cosine transform", IEEE Trans. Acoust., Speech, and Signal Processing, vol. ASSP-32, pp. 1243-1245, December 1984 is employed.

If a higher processing is required, a method of reducing a decoding processing by thinning out the number of decoded picture planes is employed. For example, a method in which only pictures which have been subjected to intra-plane encoding (intra encoding) are decoded and pictures encoded in modes other than the intra-plane encode mode are not decoded, is employed.

However, if a decoding processing is conducted by a software using, for example, a personal computer and the processing performance of the personal computer is low, even such a high processing is insufficient, thereby disadvantageously causing a disadvantage that the number of played back pictures planes greatly decreases.

SUMMARY OF THE INVENTION

It is an object of the present invention to provide a real-time picture information compression-transmission apparatus, a method thereof as well as a storage medium stored a control program for real-time picture information compression control capable of efficiently transmitting picture information in a real time manner without employing FIFO requiring overflow and underflow control, without starting a process exclusive to network output while suppressing the generation of packet loss to be low.

It is another object of the present invention to provide an compressed video data decoding apparatus capable of ensuring a higher processing speed than a conventional processing speed. It is yet another object of the present invention to provide a compressed video data decoding apparatus capable of greatly reducing compressed video data decoding load without causing so great deterioration in picture quality and decrease in the number of played back picture planes when playing back a picture.

The present invention has the following characteristics: the present invention comprises input means for receiving said picture information; an encoder encoding said picture information from the input means on a preset cycle in a real time manner; storage means for writing and storing real-time-encoded frame data on said picture information from the encoder for each frame; division means for sequentially dividing said real-time-encoded frame data stored in the storage means into packets for each frame; and transmission timing control and transmission means for controlling transmission timing to sequentially transmit the divided packets to a network after a write time for storing said frame data for the packets and before a time for storing next frame data, and for transmitting the packets to the network according to a connection-less type protocol.

Further, the present invention can be constituted to include a packet transmission timing adjustment section, a packet loss detection section and transmission timing fine adjustment parameter generation section, and a packet loss detection and bit rate feedback section. A transmission packet division section divides bit string data in a frame buffer in which frame data output from a real time encoder encoding picture information to frame data in a real time manner is written and stored for each frame, into packets of packet size suited for an MTU (Maximum Transmission Unit: Ethernet maximum transfer unit). The packet transmission timing adjustment section adjusts transmission timing for transmitting the packets divided by the transmission packet division section, i.e., adjusts transmission timing so as to transmit the packets after a write time for storing the frame data and before a time for storing the next frame data, thereby outputting the packets to the network while suppressing burst transmission of packets. A network output processing is conducted in an encoder processing loop without starting an exclusive process. The packet loss detection and transmission timing fine adjustment parameter generation section monitors the packets of each channel outputted to the network, and conducts feedback control for issuing a timing fine adjustment command to the packet transmission timing adjustment section if packet loss occurs. The packet loss detection and bit rate feedback section monitors the packets of each channel outputted to the network, and conducts feedback control by requesting the real time encoder to decrease bit rate if packet loss occurs.

The present invention comprises means for converting an inversely-quantized discrete cosine transform coefficient into a smaller base than an encoding-side discrete cosine transform base; means for performing inverse transform using inverse discrete cosine transform using the smaller base than the encoding-side discrete cosine transform base; and means for converting picture data subjected to the inverse discrete cosine transform into picture data having a same size as a size of a compressed video data.

The present invention also comprises means for low-pass filtering an inversely quantized discrete cosine transform coefficient; and means for inversely transforming the low-pass filtered data using an inverse discrete cosine transform having a base of a same size as a size of an encoding-side discrete cosine transform base, wherein the inverse discrete cosine transform is to inversely transform a non-zero discrete cosine transform coefficient.

BRIEF DESCRIPTION OF THE DRAWINGS

FIG. 22 is a block diagram showing the constitution of the twelfth embodiment according to the present invention;

FIG. 23 shows mathematical formulas;

FIG. 29 is a block diagram showing the constitution of a conventional decoding apparatus.

DETAILED DESCRIPTION OF THE PREFERRED EMBODIMENTS

The present invention will be described in detail with reference to the accompanying drawings.

Figure 1:
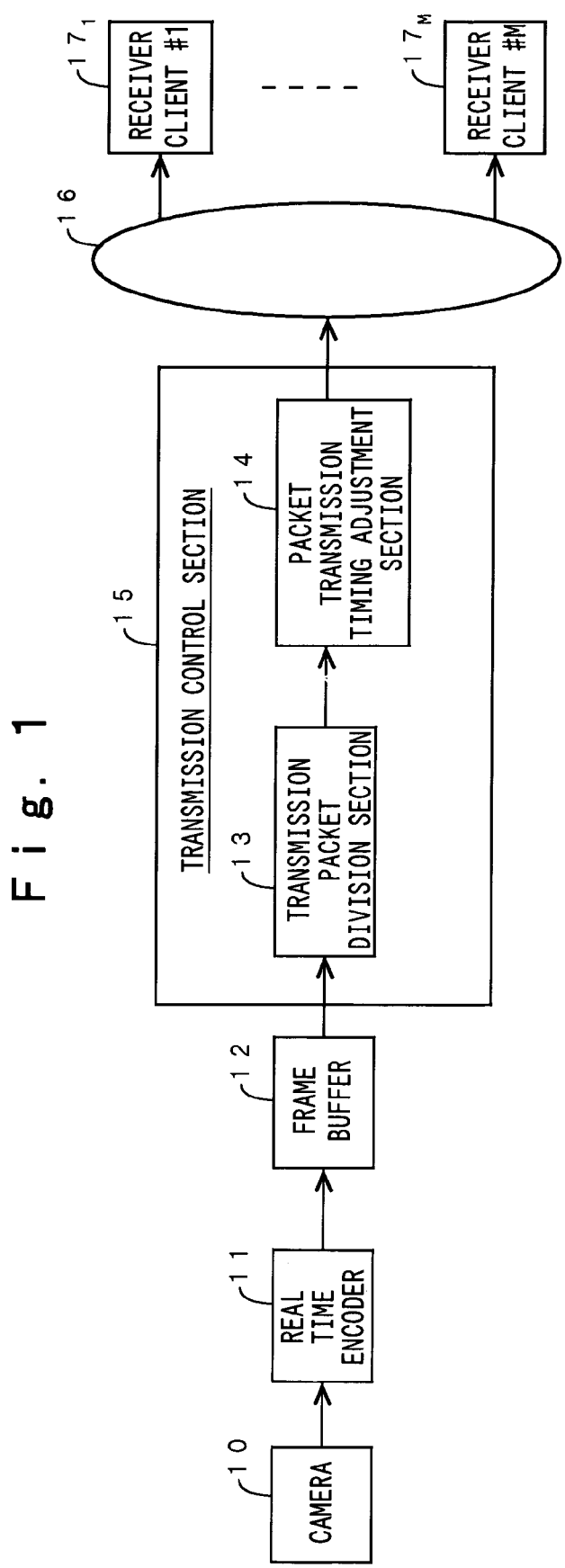
FIG. 1 is a transmission control block diagram in the first embodiment according to the present invention.
Figure 2:
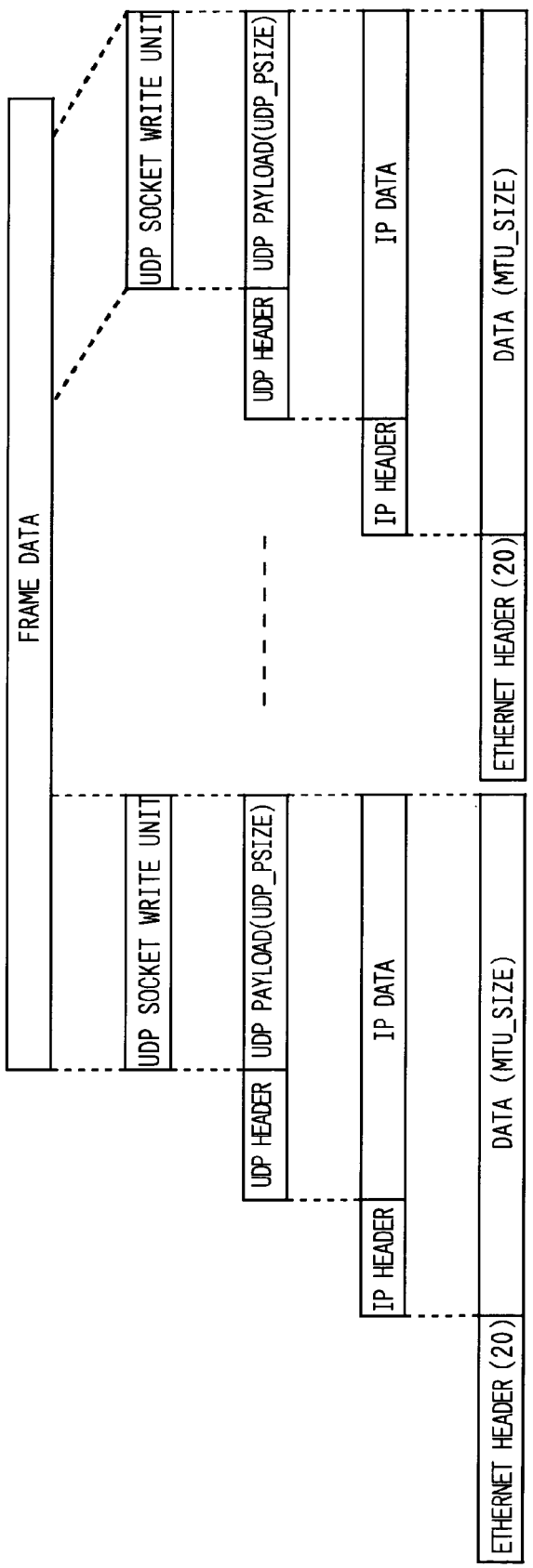
FIG. 2 is a signal frame view for explaining the division of frame data into UDP packets in the first embodiment according to the present invention.

Description will be given, as the first embodiment, to a method of efficiently transmitting live picture information by transmission control while applying a connection-less type protocol, e.g., UDP (User Datagram Protocol) to a transport protocol. FIG. 1 is a block diagram for describing the interior of a transmission control section 15 in case of efficiently transmitting live picture information by transmission control. A picture signal inputted from a camera 10 is encoded in frame units (e.g., at intervals of about 1/30 seconds) by a real time encoder 11 which encodes data in a real time manner, and written into a frame buffer 12. Next, frame data having different sizes according to frames is fed to a transmission packet division section 13. In consideration of transmission efficiency and packet transmission on a network which does not permit IP (Internet Protocol) fragmentation, the transmission packet division section 13 divides the frame data into packets of UDP payload size which can prevent the occurrence IP fragmentation and can make overhead by each of headers for the Ethernet, the IP and UDP the smallest. Specifically, as shown in FIG. 2, the frame data is divided into packets of such size as to be suited for the Ethernet maximum transfer unit (MTU). To calculate a UDP payload size (UDP_PSIZE), the following formula (3) is used:

$$UDP\_PSIZE = MTU\_SIZE - IP\_HEADER\_SIZE - UDP\_HEADER\_SIZE \quad (3)$$

Here, UDP_PSIZE: payload size of UDP packet to be transmitted (unit: byte),

MTU_SIZE: Ethernet maximum transfer unit (usually 1500 bytes),

IP_HEADER_SIZE: IP header size (20 bytes if no option is added), and

UDP_HEADER_SIZE: UDP header size (usually 8 bytes).

Also, the number (CK) of UDP packets divided from the K-th frame data (BK bytes) is calculated by the following formula (4). In the formula (4), it is assumed to reckon decimals as a unit.

$$CK = BK/UDP\_PSIZE \quad (4)$$

Here, CK: number of UDP packets divided from K-th frame,

BK: data size of K-th frame (unit: byte),

UDP_PSIZE: payload size of UDP packet to be transmitted (unit: byte).

The packet transmission timing adjustment section 14 will be described, referring again to FIG. 1. The K-th frame data which has been divided into CK packets by the transmission packet division section 13 is transmitted to the network 16 by the packet transmission timing adjustment section 14 by the time the real time encoder 11 outputs the (K+1)th frame data to the frame buffer 12, and fed to receiver clients 17l to 17m.

Figure 3:
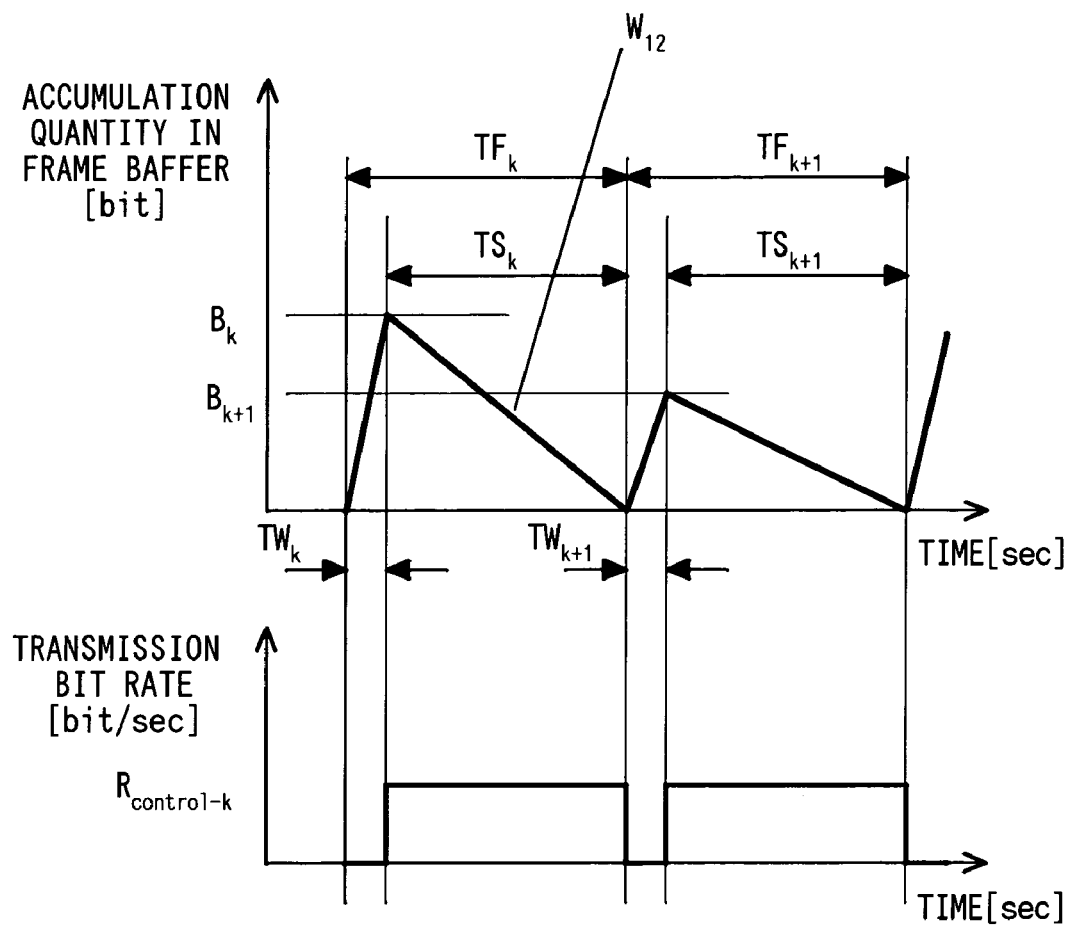
FIG. 3 is a time chart for describing a frame buffer storage concept in the first embodiment according to the present invention.

The transmission timing of each of the CK UDP packets will be described with reference to FIG. 3. Assuming that a frame distance between the K-th frame and the (K+1)th frame is TFK and time for which the real time encoder writes the K-th frame data into the frame buffer is TWK, time TSK for which the K-th frame data can be transmitted to the network is as shown in the following formula (5):

$$TSK = TFK - TWK \quad (5)$$

Here, TSK: transmission time [sec.] for transmitting K-th frame data to network, TFK: frame distance [sec.] between K-th frame and (K+1)th frame, and TWK: time [sec.] for which encoder writes K-th frame data into frame buffer.

According to the present invention, the CK UDP packets are transmitted for time TSK while arranging the packets equidistantly. In that case, the transmission bit rate (R control-K) of the K-th frame is a gradient of a waveform W12 shown in FIG. 3 and calculated from a formula (6). Compared with the conventional direct transmission method, the transmission bit rate of each frame is close to the average stream bit rate as shown in a formula (7), so that burst transmission can be avoided.

$$R\text{ control-}K = BK/TSk[\text{bit/sec}] \quad (6)$$

$$R\text{ no-control-}K > B\text{cotrol-}K > Rs \quad (7)$$

Figure 14:
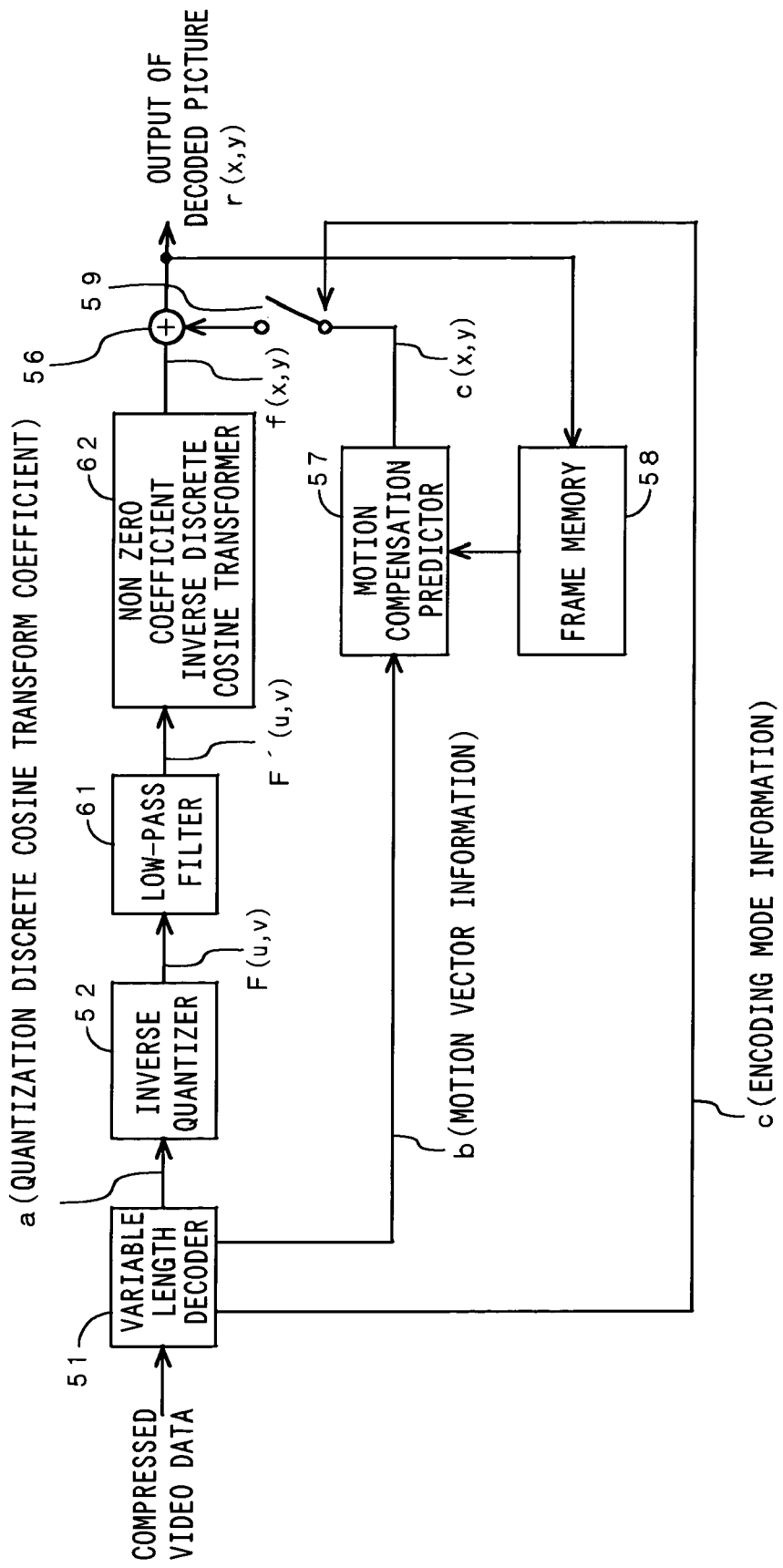
FIG. 14 is a block diagram showing the constitution of the sixth embodiment according to the present invention.

Here, BK: quantity of K-th frame data accumulated in frame buffer,

R control-K: transmission bit rate for transmitting K-th frame to network according to the present invention, R no-control-K: transmission bit rate for transmitting K-th frame to network according to direct transmission method shown in FIG. 14, and RS: average stream bit rate.

Figure 4:
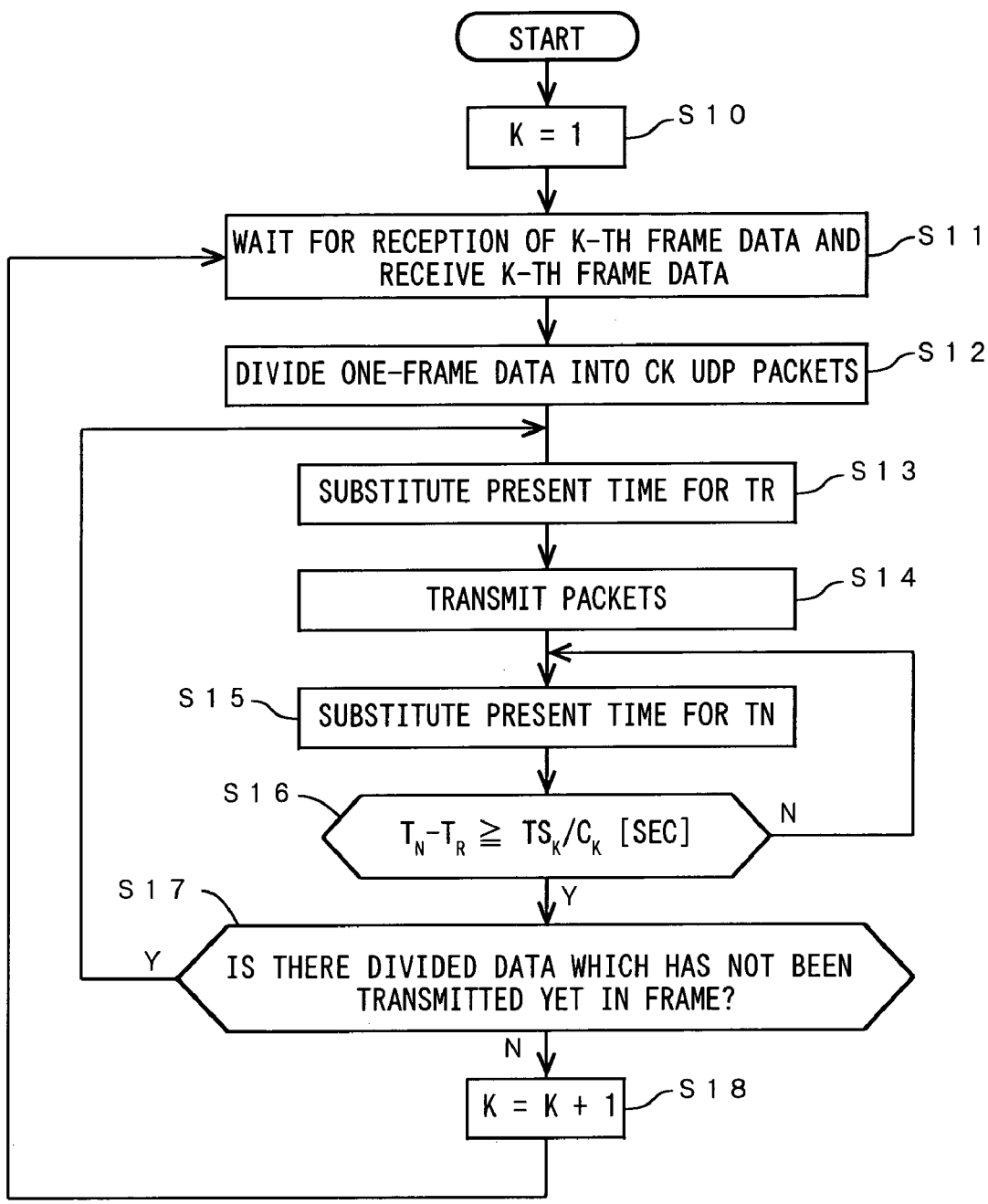
FIG. 4 is a flow chart showing the operation of a transmission control section in the first embodiment according to the present invention.

The operation of the packet transmission timing adjustment section 14 shown in FIG. 1 will be described in detail with reference to the transmission control section flow chart of FIG. 4. First, an initial value 1 is substituted for the frame number K in a step S10. The K-th frame data inputted in a step S11 is divided into CK pieces of data calculated from the formula (4) in a step S12. The divided data are defined as (D1, D2, D3, . . . , DCK), respectively. Next, in a step S14, a UDP packet with the leading data D1 thus divided used as a payload is transmitted. At this moment, transmission time is substituted for packet transmission start time TR in a step S13. Next, it is determined whether or not the difference between the present time TN substituted in a step S15 and the packet transmission start time TR becomes not less than TSK/CK based on a determination formula (formula (8)) in a step S16. If a determination result is NO, time does not reach packet transmission timing and the steps S15 and S16 are repeated. If the determination result is YES, time reaches the transmission timing and a step S17 follows. If there is divided data which has not been transmitted yet in the frame, the next data (D2 in this case) is transmitted in packets. This operation is repeated up to the data DCK. When there is no divided data which has not been transmitted in a step S17, the numbers of frames waiting to be received are increased by "1" in a step S18 and the processing is moved to waiting for the reception of the next frame data (the step S11).

$$TN-TR \leq TSK/CK [\text{sec}] \quad (8)$$

Here, TN: present time,

TR: packet transmission start time,

CK: number of UDP packets divided from K-th frame, and

TSK: transmission time [sec] for which K-th frame data is transmitted to network.

As described above, according to the first embodiment, the transmission control section 15 does not transmit data to the network for a time for which the real time encoder 11 writes the data into the frame buffer 12. Due to this, it is possible to incorporate a network output processing into the processing loop of the real time encoder 11. As a result, compared with the conventional method in which FIFO is used and another process for network output is started, it is possible to realize a network output processing with simple packaging. Furthermore, by extending the transmission time for transmitting frame data to the network to a time at which the next frame is written into the buffer, it is possible to avoid burst transmission of frame data packets to the network compared with the conventional direct transmission method and to thereby suppress the generation of packet loss and to improve transmission efficiency.

Figure 5:
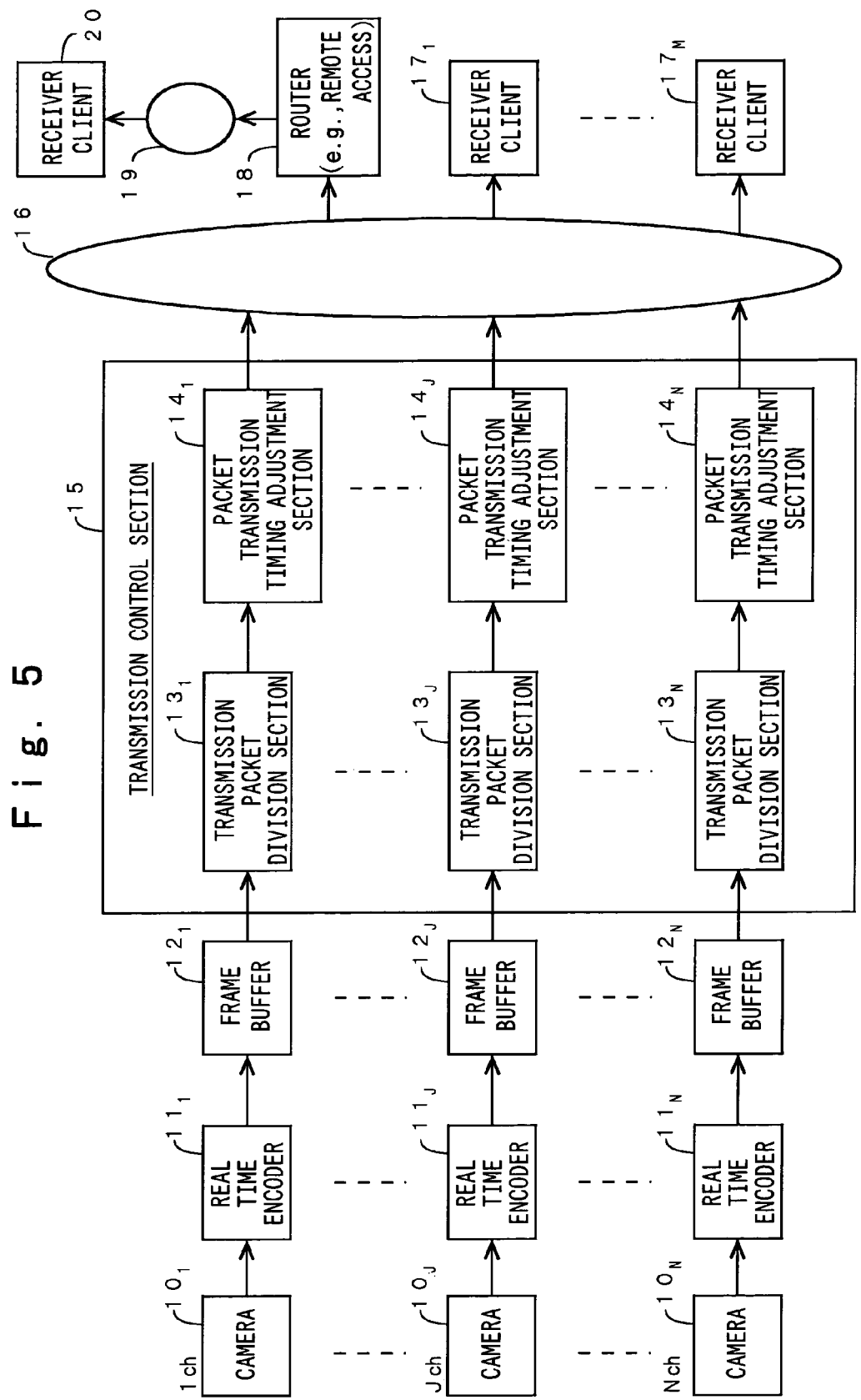
FIG. 5 is a block diagram for describing filtering in the second embodiment according to the present invention.

Next, description will be given, as the second embodiment, to a method capable of transmitting only filtered picture information by filtering transmission packets using UDP port numbers or IP multi cast addresses even if a network band in the course of transmission becomes narrower, with reference to FIG. 5. Since a transmission method for each channel is the same, J channel ($1 \leq J \leq N$, where N is the number of channels) representing channels will be described. As in the case of the first embodiment, picture information outputted from a camera 10 is real-time encoded by a real time encoder 11J and written into a frame buffer 12J. Frame data written in frame units (e.g., at intervals of about 1/30 seconds) is divided to be suited for MTU size by a transmission packet division section 13J and the divided transmission packets are sequentially transmitted to a network 16 by a packet transmission timing adjustment section 14J while avoiding burst transmission.

All the data transmitted for the respective channels are usually fed to receiver clients 17l to 17m through the network 16. However, if the band of a network 19 after a router (such as a remote access) 18 becomes narrower to make it impossible for all the data on 1 to N channels to pass through the band, then packet loss occurs to all channel data and no channel cannot be received by a reception client 20. To avoid such a potential disadvantage, individual port numbers are allotted to channel packets and the router (e.g., remote access) 18 makes filtering setting to pass through only a packet having a port number (in this case, the port number of the J channel ($1 \leq J \leq N$, where N is the number of channels)) wanted to be passed through the network band after the router (e.g., remote access) 18. By doing so, the receiver client 20 can normally receive designated channel data.

Instead of allotting the different port numbers to the channels, respectively, IP multi-cast addresses may be allotted to the respective channels. By doing so, only the channel data corresponding to the IP multi-cast address for which the reception client 20 issues a reception request (by an IGMP protocol Join message), can be passed through the router (e.g., remote access) 18 and the receiver client 20 can, therefore, normally receive designated channel data.

As stated above, according to the second embodiment, not only multi-channel transmission but also filtering is conducted using either the UDP port numbers or the IP multi-cast addresses, whereby it is possible to transmit only the filtered picture information even if the network band through which the data is transmitted is narrowed.

Figure 6:
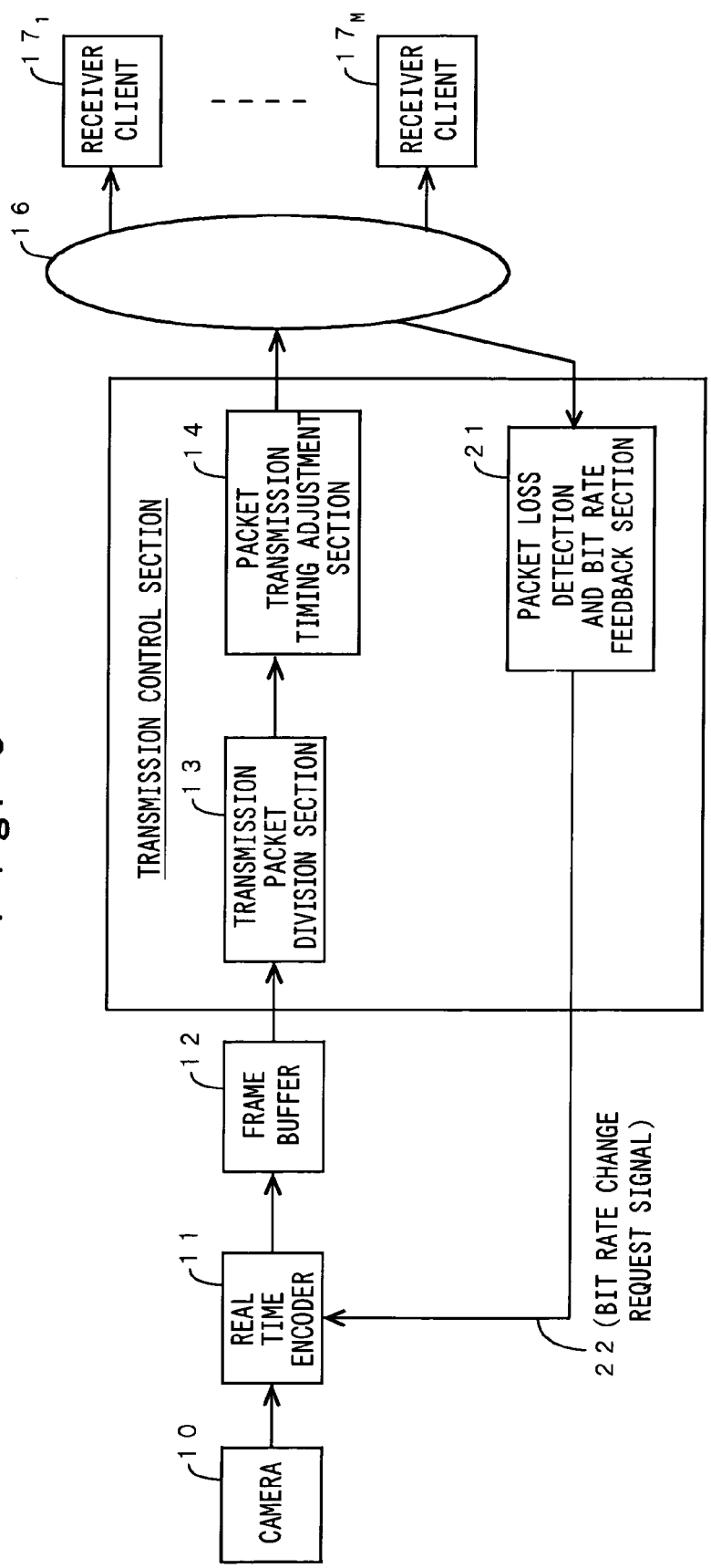
FIG. 6 is a block diagram for describing bit rate feedback control in the third embodiment according to the present invention.

Next, description will be given to, as the third embodiment, a case of adding a packet loss detection function and a bit rate feedback function, with reference to FIG. 6 showing bit rate feedback. As in the case of the first embodiment, a picture signal inputted from a camera 10 is encoded by a real time encoder 11 in frame units (e.g., at intervals of about 1/30 seconds) and written into a frame buffer 12. Next, each frame data read from the frame buffer 12 is divided into packets in CHUNK_SIZE shown in a formula (9) by a transmission packet division section 13 and serial numbers are added to the respective packets. A packet transmission timing adjustment section 14 transmits the packets to a network 16 while adjusting transmission timing. The transmitted data are received by receiver clients 17l to 17m through the network 16.

Figure 7:
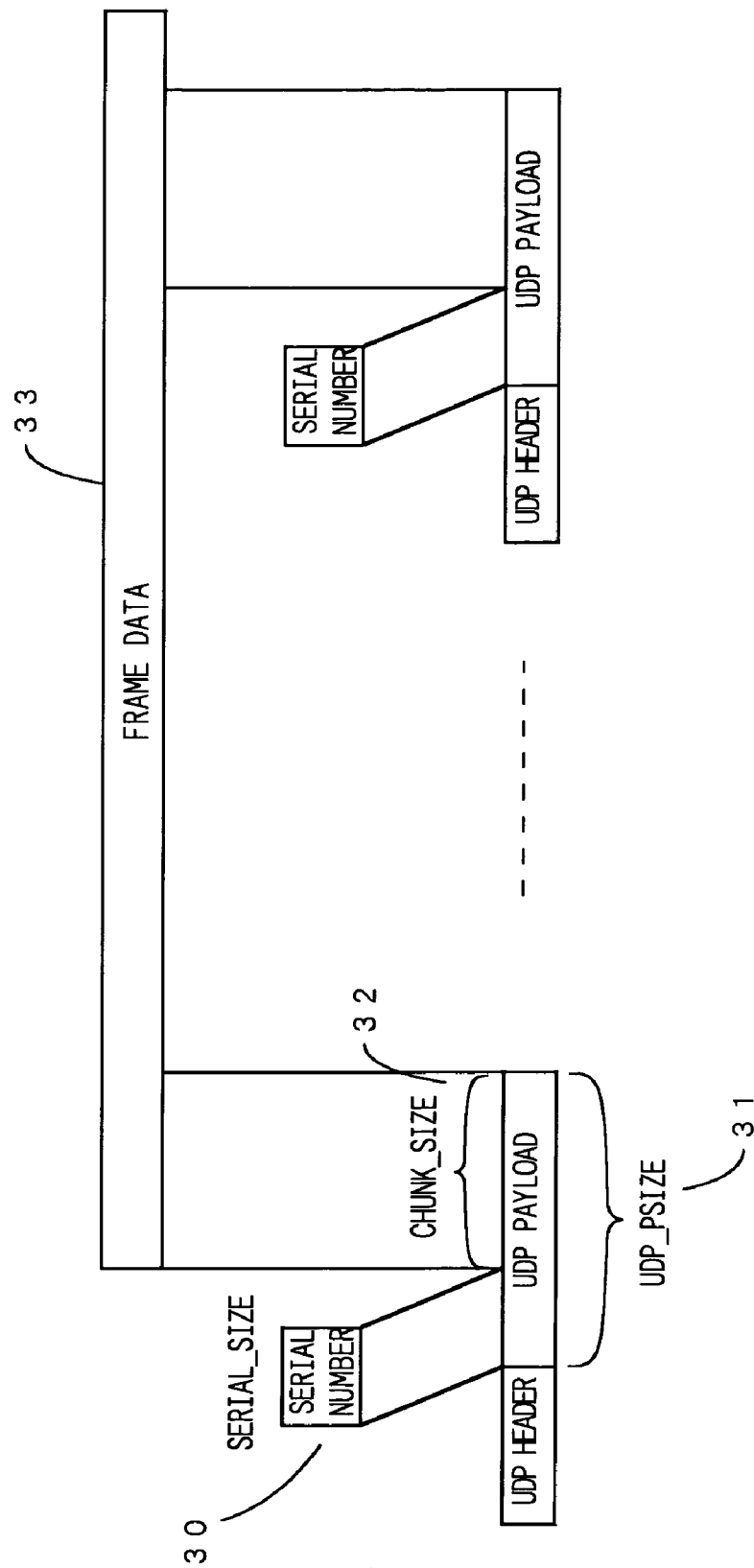
FIG. 7 is a block diagram for describing a serial number adding operation in the third embodiment according to the present invention.

Here, the addition of serial numbers will be described with reference to FIG. 7 which shows a serial number addition function. A field for adding serial numbers 30 is provided in a UDP payload 31 and values increased by 1 from serial numbers for the respective packets are stored in the field. A field 32 in which divided frame data are stored decreases by an area of the serial numbers (to be referred to as "SERIAL_SIZE"). The size (CHUNK_SIZE) into which the frame data 33 is divided is expressed as shown in a formula (9) below while using UDP_PSIZE in the formula (3):

$$CHUNK\_SIZE = UDP\_PSIZE - SERIAL\_SIZE \quad (9)$$

Here, UDP_PSIZE: payload size of UDP packet to be transmitted (unit: byte),

SERIAL_SIZE: size storing serial numbers (unit: byte), and

CHUNK_SIZE: size into which the frame data is divided (unit: byte).

In addition, the number (CK) of UDP packets divided from the K-th frame data (BK bytes) is calculated by a formula (10). In the formula (10), it is assumed to reckon decimals as a unit.

$$CK=BK/\text{CHUNK\_SIZE} \tag{10}$$

Here, CK: number of UDP packets divided from K-th frame,
BK: data size of K-th frame (unit: byte), and
CHUNK_SIZE: size into which the frame data is divided (unit: byte).

In FIG. 6, the packets transmitted to the network 16 are constantly monitored by a packet loss detection and bit rate feedback section 21 in the transmission-side same segment and a packet loss rate PLR is calculated by a formula $$PLR=PLN/PN \tag{11}$$

Here, PLR: packet loss rate,
PLN: the number of packets lost for T seconds,
PN: total number of packets transmitted for T seconds, and
T: time interval for measuring packet loss rate (unit: second).

The packet loss detection is conducted by watching whether the serial numbers (increased by one for the respective packets) added to the packets which have been sequentially monitored are arranged in order. If the serial numbers skip, it is recognized that packet loss occurs.

If the packet loss rate PLR exceeds a preset value L THB ($0 \leq$ L THB $\leq 1$), it is judged that a present transmission bit rate exceeds a transmittable network band level and a bit rate change request signal 22 requesting to decrease bit rate is transmitted to the real time encoder 11. The real time encoder 11 which has received the bit rate change request signal 22, changes the encoding bit rate to W-times ($0 \leq W \leq 1$) of the present rate. By repeating the above-stated operations, data can be transmitted with the packet loss rate PLR of not more than the preset value L THB.

According to the third embodiment described above, by adding the packet loss detection and bit rate feedback functions and controlling the transmission bit rate in accordance with a network band, it is possible to avoid packet loss and ensure efficient transmission even if the network band is insufficient or the network band varies.

Figure 8:
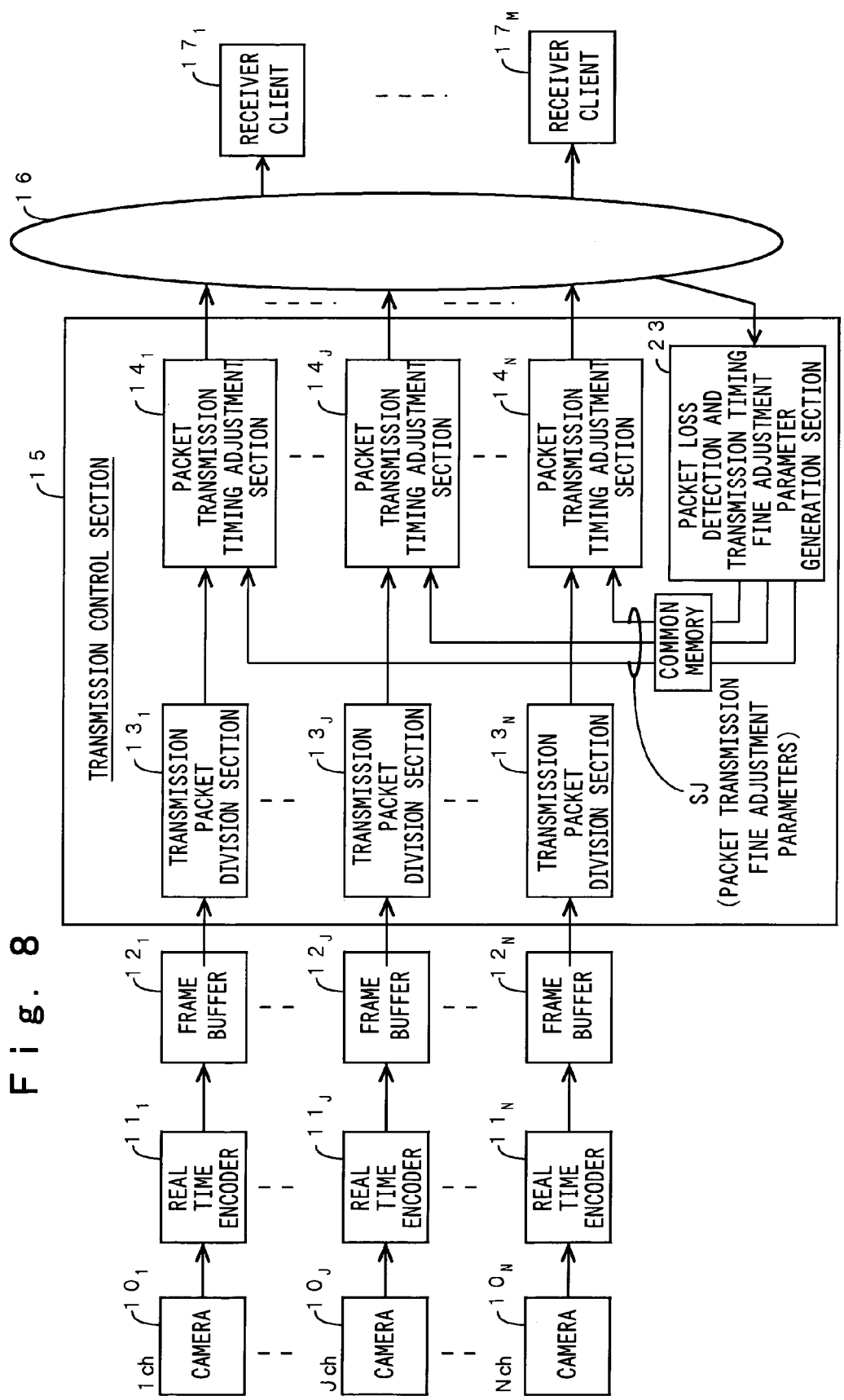
FIG. 8 is a block diagram for describing fine adjustment feedback control over transmission timing for a plurality of channels in the fourth embodiment according to the present invention.

Next, description will be given, as the fourth embodiment, to a case of adding a packet loss detection function and a bit rate feedback function when transmitting multi-channel live pictures, with reference to FIG. 8 showing transmission timing fine adjustment feedback. Since each channel operates in the same manner, a method of transmitting J channel ($1 \leq J \leq N$, where N is the number of channels) will be described to represent the channels. As in the case of the third embodiment, a picture signal inputted from a camera 10J is encoded in frame units (e.g., at intervals of about 1/30 seconds) by a real time encoder 11J and written into a frame buffer 12J. Next, frame data read from the frame buffer 12J is divided into packet of frame data division size (CHUNK_SIZE) as expressed by a formula (9) by an transmission packet division section 13J, serial numbers are added to the divided packets and the divided data are transmitted to a network 16 while a packet transmission timing adjustment section 14J is adjusting transmission timing. The transmitted data are received by receiver clients (17l to 17m) through the network 16.

The packet loss rate PLRJ ($1 \leq J \leq N$, where N is total channel number) of each channel of the packet transmitted to the network 16, which is constantly monitored by a packet loss detection and transmission timing fine adjustment parameter generation section 23, is calculated by a formula (12):

$$PLRJ=PLNJ/PNJ \tag{12}$$

Here, PLRJ: packet loss rate of J channel data,
PLNJ: the number of packets lost for T seconds with respect to J channel data,
PNJ: total number of packets transmitted for T seconds with respect to J channel data, and
T: time interval for measuring packet loss rate (unit: second).

The packet loss detection and timing fine adjustment parameter generation section 23 determines packet transmission fine adjustment parameters SJ so that the sum of the packet loss rates PLRJ of the channels becomes a minimum while sequentially changing packet transmission fine adjustment parameters SJ (S1, S2, ..., SN, where N is total channel number, $1 \leq J \leq N$) fed back to the packet transmission timing adjustment section 14J according to the frame reception timing. The detail of changing SJ will be described later. This packet transmission fine adjustment parameters SJ are passed on to the packet transmission timing adjustment section 14J through a common memory 25 and used when fine-adjusting transmission timing.

Figure 9:
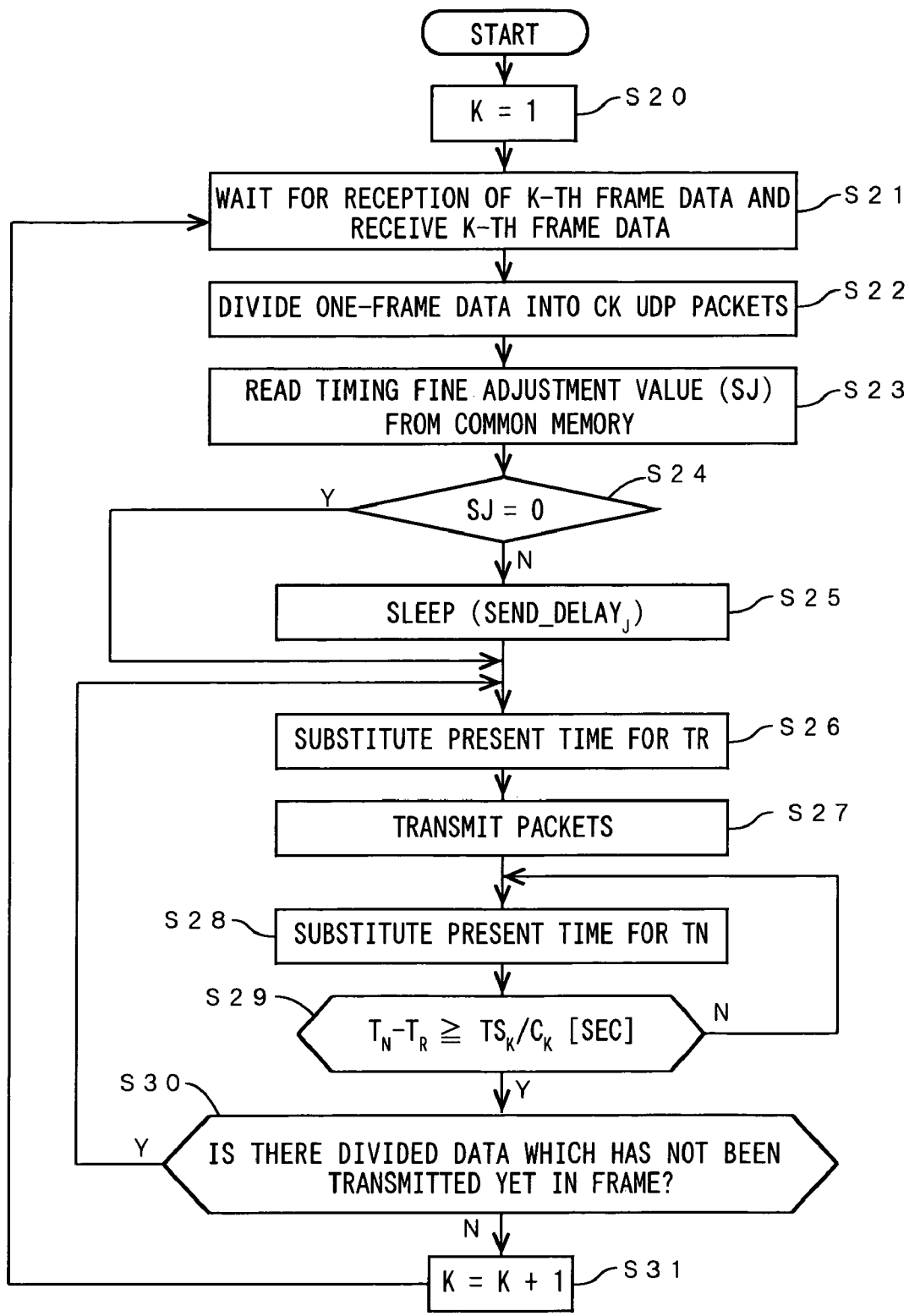
FIG. 9 is a flow chart for describing the operation of a transmission control section in the fourth embodiment according to the present invention.

The operation of the packet transmission timing adjustment section 14J will be described with reference to the flow chart of FIG. 9. First, an initial value 1 is substituted for frame number K in a step S20. The K-th frame data inputted in a step S21 is divided into CK pieces of data calculated from a formula (10) in a step S22. The divided data are defined as (D1, D2, D3, ..., DCK), respectively. Next, in a step S23, timing fine adjustment parameters SJ ($1 \leq J \leq N$, where N is the number of channels) for the J channel are read from the common memory. If a determination result in a step S24 shows that SJ is 0, a step S26 follows. If SJ is a value other than 0, a time weight of transmission delay SEND DELAYJ calculated by a formula (13) is added to thereby delay the transmission timing of J channel packets in a step S25 and the step S26 follows.

$$\text{SEND\_DELAYJ}=MTU\_SIZE*SJ*8/BR\_NET \tag{13}$$

Here, SEND_DELAYJ: J channel packet transmission delay (unit: second),
MTU_SIZE: Ethernet maximum transfer unit, usually 1500 bytes,
SJ: J channel timing fine adjustment parameters (SJ, $1 \leq J \leq N$, where N is the number of channels), and
BR_NET: effective network band (unit: bit/sec).

Next, a UDP packet with a leading data D1 divided used as a payload is transmitted in a step S27. At this moment, transmission time is substituted for packet transmission start time TR in the step S26. Next, it is determined whether the difference between the present time TN substituted in a step S28 and TR is not more than TSK/CK using the determination formula (formula 8) in a step S29. If a determination result is NO, time does not pass to reach packet transmission timing and the steps S28 and S29 are, therefore, repeated. If the determination result is YES, time already passes to reach the packet transmission timing and a step S30 follows. In the step S30, if there is divided data of the frame which has not been transmitted yet, the next data (D2 in this case) is transmitted in packets. These operations are repeated up to the data DCK. When no divided data which has not been transmitted is left in the step S30, the frame number K waiting to be received is increased by 1 in a step S31, moving to a step of waiting for the reception of the next frame data (in the step S21).

Next, a method of generating timing fine adjustment parameters SJ (S1, S2, S3, ..., SN, where N is total channel number, $1 \leq J \leq N$) will be described with reference to the flow chart of FIG. 10. First, in a step S40, default values 0 are substituted for all timing fine adjustment parameters SJ (S1, S2, S3, . . . , SN, where N is total channel number, $1 \leq J \leq N$). Next, in a step S41, a packet loss rate PLRJ (see the formula (12)) is calculated for each channel. In a step S42, it is determined whether or not the sum of packet loss rates of all the channels is equal to 0. If the sum is equal to 0, the steps S41 and S42 are repeated. If not equal to 0, a step S43 follows. In the step S43, the latest frame number (RCFN) of reference channel data received as an initial value is substituted for the frame number K of a reference channel corresponding to frame timing at which the next packet loss rate is to be measured. The channel having the lowest frame rate (frames/sec) among the 1 to N channels is selected as the reference channel. In a step S44, all combinations of the timing fine adjustment parameters SJ (S1, S2, S3, , SN, where N is total channel number, $1 \leq J \leq N$) are changed one by one in a range of $0 \leq SJ \leq M$, to thereby form a processing loop for executing steps S44, S45, S46, S47, S48 and S49. Here, M represents an upper limit of the packet transmission timing fine adjustment parameter SJ (S1, S2, S3, . . . , SN, where N is total channel number, $1 \leq J \leq N$), and is deduced from a formula (14) while decimals are discarded to provide an integer not lower than 0. The packet transmission timing fine adjustment parameter SJ indicate by how many packets the packet transmission timing is delayed. FIG. 11 showing the packet transmission timing fine adjustment parameters SJ ($1 \leq J \leq N$, where N is total channel number) indicates that transmission timing of a packet transmitted at a time P10 (while SJ is 0) is delayed up to a time P11 (where SJ is M−1).

$$M=(CHUNK\_SIZE*8/(BR\_STREAM\_TOTAL/N)/(MTU\_SIZE *8/BR\_NET) \quad (14)$$

Here, M: upper limit of packet transmission timing fine adjustment parameter SJ (S1, S2, S3, SN, where N is total channel number, $1 \leq J \leq N$), CHUNK_SIZE: sizes into which frame data is divided (unit: byte), BR_STREAM TOTAL: total bit rate of 1 to N channels, N: number of channels, MTU_SIZE: Ethernet maximum transfer unit, usually 1500 bytes, BR_NET: execute bit rate of network (BR_STREAM_TOTAL/N): average bit rate per channel, (CHUNK_SIZE*8/(BR_STREAM_TOTAL/N): average packet transmission interval per channel (unit: second), and (MTU_SIZE*8/BR_NET): time required to transmit MTU.

Figure 10:
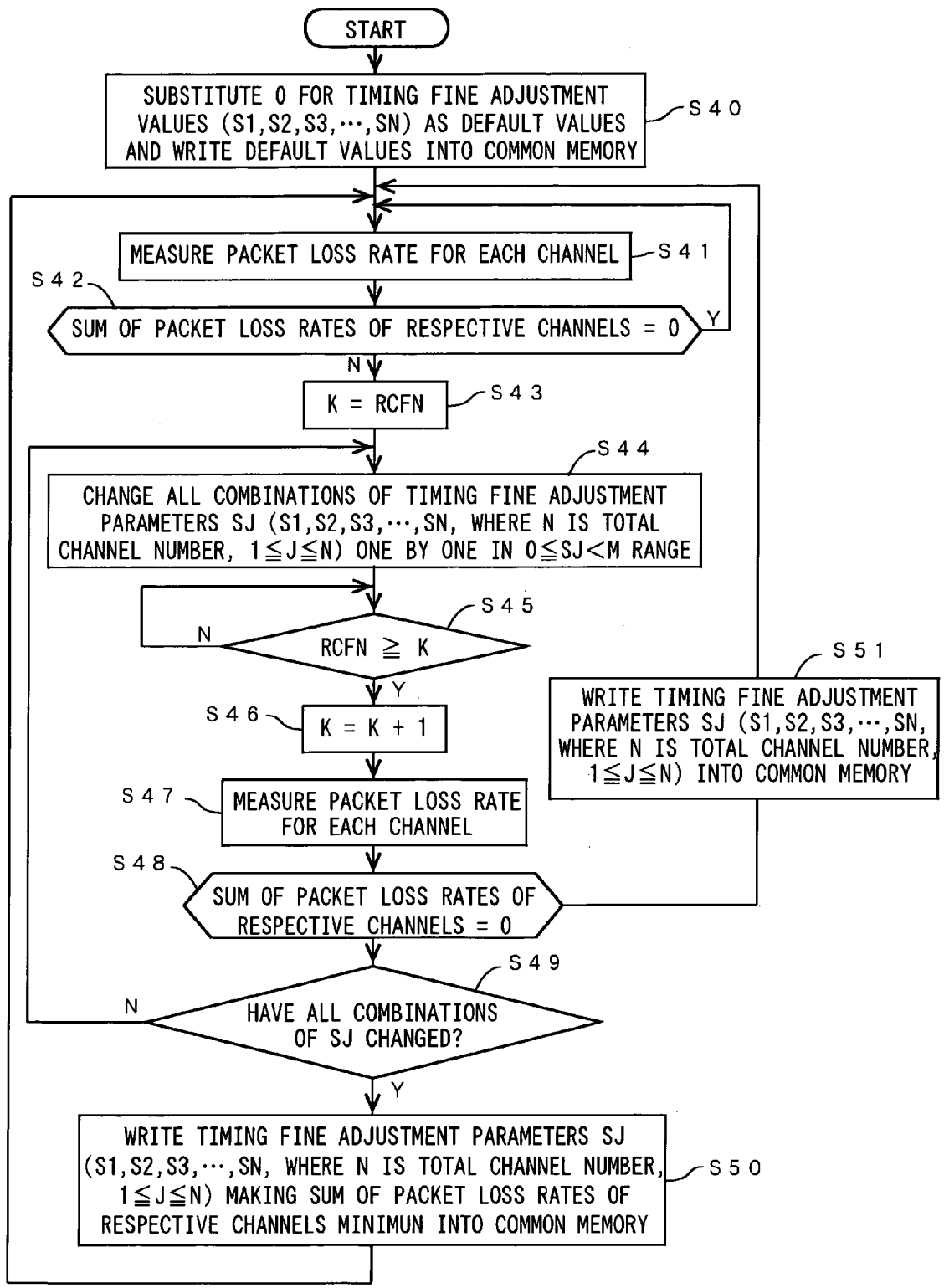
FIG. 10 is a flow chart for describing the operation of a packet loss detection and transmission timing fine adjustment parameter generation section in the fourth embodiment according to the present invention.
Figure 11:
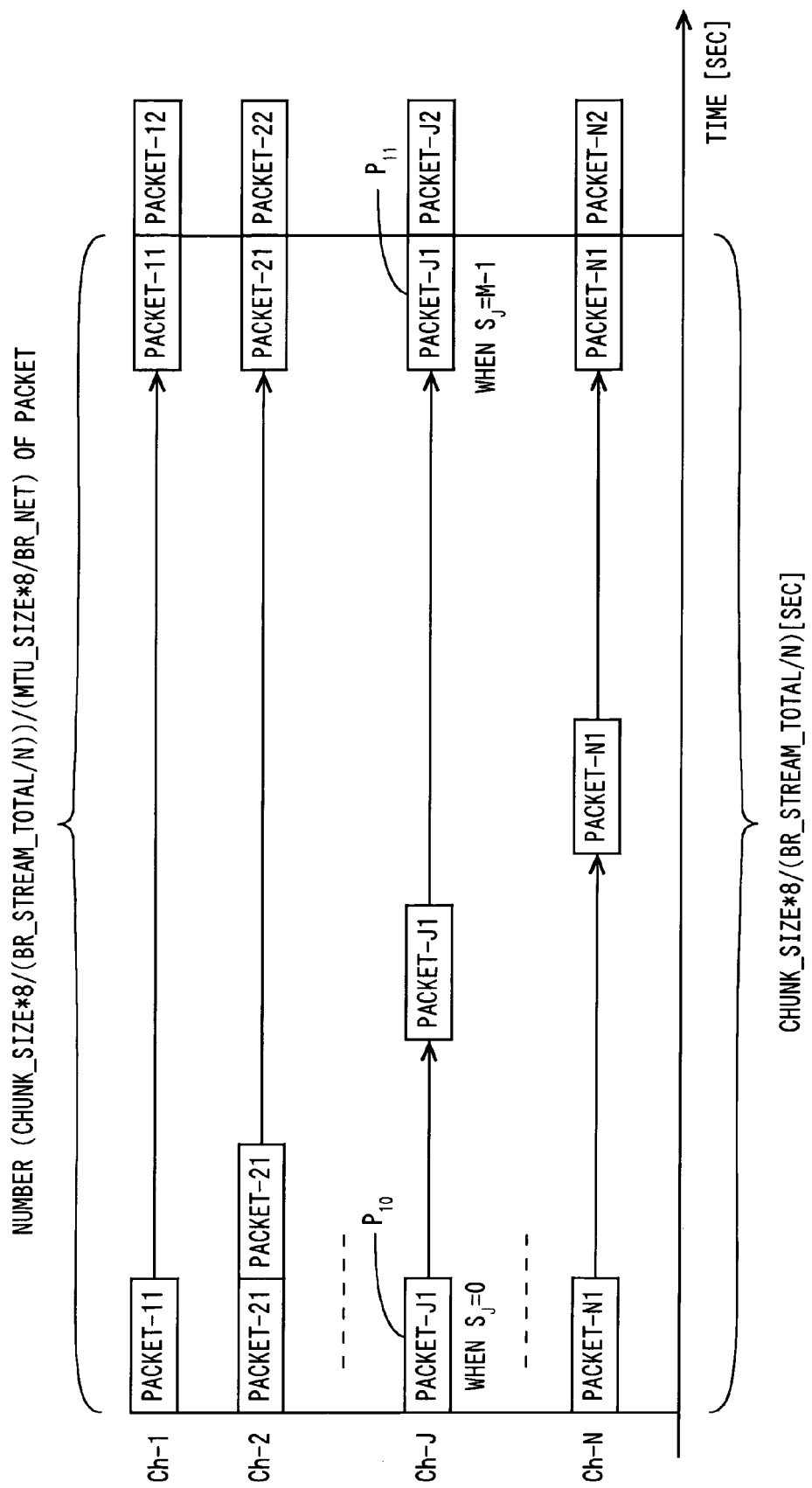
FIG. 11 is a time chart for describing packet transmission timing fine adjustment parameters SJ ($1 \leq J \leq N$, where N is total channel number) in the fourth embodiment according to the present invention.

A weight continues to be given until the latest frame number (RCFN) of the received reference channel data becomes not less than K in the step S45 of FIG. 10. When the number becomes not less than K, the value of K is increased by 1 in the step S46. This indicates that the loop processing of the steps S44 to S49 is performed once for each frame of the reference channel. The loop processing of the steps S44 to S49 is completed at a timing when the sum of packet loss rates of all channels calculated in the step S48 using the packet loss rate PLRJ ($1 \leq J \leq N$, where N is total channel number) for each channel calculated in the step S47 becomes equal to 0, or when the loop processing is executed for all combinations in the step S49. The parameters SJ are changed in the order of (S1, S2, S3, . . . , SN)=(0, 0, . . . , 0)→(1, 0, . . . , 0)→(1, 1, . . . , 0)→(1, 1, . . . , 1)→(2, 1, . . . , 1)→(2, 2, . . . , 1)→(2, 2, . . . , 2)→(M−1, M−2, . . . , M−2)→(M−1, M−1, . . . , M−1), thereby executing $M^N$ combinations. If the loop processing is completed in the step S48, the timing fine adjustment parameters SJ (S1, S2, S3, . . . , SN, where N is all channel number, $1 \leq J \leq N$) at that time are written into the common memory from which the parameters can be read out by the packet transmission timing adjustment sections for the respective channels in a step S51, and the processing returns to the step S41. If the loop processing is completed in the step S49, timing fine adjustment parameters SJ (S1, S2, S3, . . . , SN, where N is total channel number, $1 \leq J \leq N$) which make the sum of packet loss rates of the respective channels a minimum are written into the common memory in the step S50, and the processing returns to the step S41.

As stated so far, according to the fourth embodiment, if the packet loss detection and the packet transmission timing fine adjustment are conducted for each channel when transmitting a multi-channel live picture, it is possible to suppress the generation of packet loss and to improve transmission efficiency at the time of transmitting multi-channel live picture information.

While the first to fourth embodiments of the present invention have been described so far in detail with reference to the drawings, it is obvious that specific examples of constitution should not be limited to these first to fourth embodiments and that any changes in design within the range of the scope of the invention are contained in the range of the technical concept of the present invention.

Figure 12:
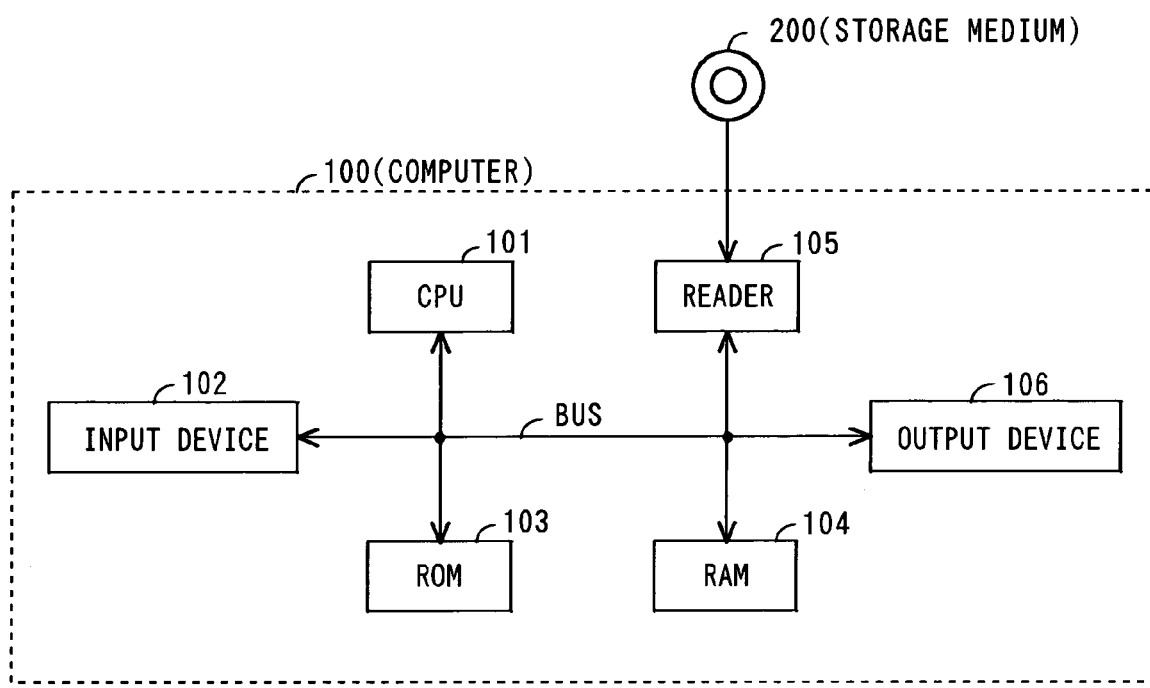
FIG. 12 is a block diagram showing a constitution of computer performing of the first to twelfth embodiment according to the present invention.

In case of the above-described first to fourth embodiments, for example, a transmission control program is recorded on a computer readable storage medium 200 shown in FIG. 12 and the transmission control program recorded on the storage medium 200 are read by a computer 100 shown in FIG. 12 to allow executing desired transmission control. Here, the transmission control program is control procedures for executing the functions of the transmission control section 15 shown in FIGS. 1, 5, 6 and 8.

The computer 100 shown in FIG. 12 consists of a CPU 101 executing the above-stated transmission control program, an input device 102 such as a keyboard or a mouse, an ROM (Read-Only Memory) 103 recording various data, an RAM (Random-Access Memory) 104 recording operation parameters and the like, a reader 105 reading transmission program from the storage medium 200, an output device 106 such as a display or a printer, and a bus BUS connecting the respective elements of the apparatus.

The CPU 101 reads the transmission control program recorded on the storage medium 200 through the reader 105 and then executes the transmission control program, thereby making it possible to conduct the above-described transmission control program.

Here, the storage medium 200 involves not only recording mediums of various portable types such as an optical disk, a floppy disk, a hard disk and the like, but also recording mediums temporarily storing and holding data in a transmission medium such as a network.

In a transmission simulation experiment while using ITU-TH. 263-base live picture information, if picture information of 512 Kbps was transmitted with a network use rate of 60% on a 10 Mbps, 10 Base-T LAN, the packet loss rate of the method and apparatus according to the present invention was reduced to 0.0% from the packet loss rate of the conventional method of 0.20%. If picture information of 100 Kbps was transmitted on the same conditions, the packet loss of the method and apparatus according to the present invention was reduced to 0.0% from the packet loss rate of the conventional method of 0.32%. If picture information of 512 Kbps was transmitted with a network use rate of 70%, the packet loss rate of the method and apparatus according to the present invention was 0.28% compared with that of the conventional method of 0.68%. If picture information of 100 Kbps was transmitted on the same conditions, the packet loss of the method and apparatus according to the present invention was reduced to 0.03% from the packet loss rate of the conventional method of 0.19%.

Figure 13:
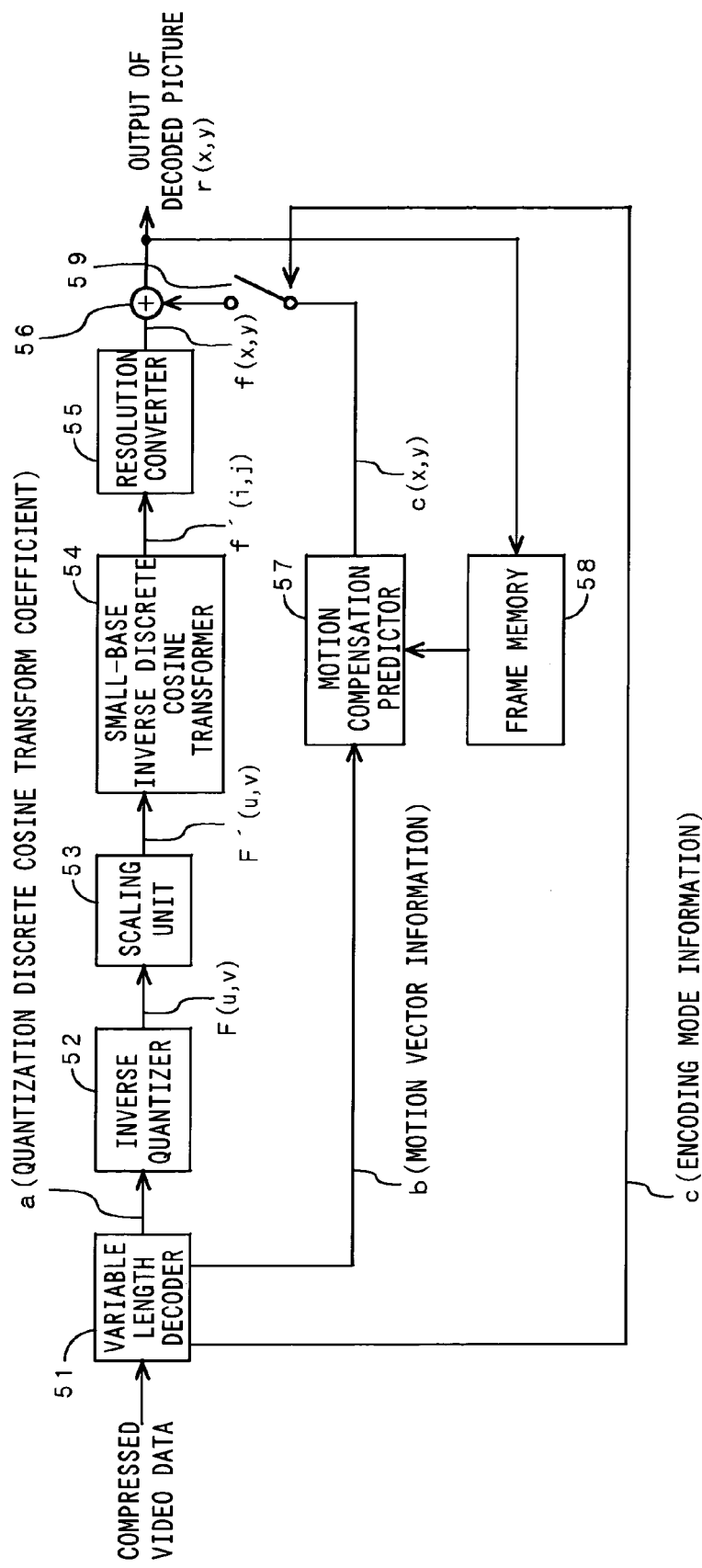
FIG. 13 is a block diagram showing the constitution of the fifth embodiment according to the present invention.

Next, the fifth embodiment of the present invention will be described with reference to the block diagram of FIG. 13. It is noted that FIG. 13 shows one example of the internal constitution of the receiver client shown in FIG. 1. The same reference symbols as those in FIG. 29 denote the same or equivalent constituent elements. In this embodiment, data is subjected to inverse discrete cosine transform at a decoding side while using a smaller base than that of the discrete cosine transform at an encoding side.

Compressed video data is inputted into a variable length decoder 51. The variable length decoder 51 decodes quantization discrete cosine transform coefficients a, motion vector information b, encode mode information c and the like. The quantization discrete cosine transform coefficients a thus decoded are inputted into an inverse quantizer 52, the motion vector information b is inputted into a motion compensation predictor 57 and the encode mode information c controls switching means 59 to be described later.

The quantization discrete cosine transform coefficients a inputted into the inverse quantizer 52 are dequantized and discrete cosine transform coefficients F(u, v) are outputted. The discrete cosine transform coefficients F(u, v) are inputted into a scaling unit 53, which unit scales coefficient data. To conduct scaling, each discrete cosine transform coefficient is changed according to a formula given as a formula (15) in FIG. 23.

In the formula, F(u, v) and F'(u, v) are discrete cosine transform coefficients inputted into the scaling unit 53 and discrete cosine transform coefficients which have been scaled, respectively. Also, M×N (where N is a positive even umber) is the base size of encoding-side discrete cosine transform, u and v are coordinates of the discrete cosine transform coefficients in horizontal and vertical directions, respectively, where u=0, 1, . . . , (N/$2^{p1}$−1) and v=0, 1, . . . ,(N/$2^{p2}$−1), respectively. Symbols p1 and p2 are parameters (integers) for determining the base size of the small-base inverse discrete cosine transform in horizontal and vertical directions, respectively, where the base size is N/$2^{p1}$ and N/$2^{p2}$ in horizontal and vertical directions, respectively. For example, at p1 =p2=1, base size is N/2×N/2.

Further, for simplifying the process, scaling as shown in the following formula (16) can be utilized:

$$F'(u, v)=F(u, v)/\{(2^{p1/2})\times(2^{p1/2})\} \quad (16)$$

The discrete cosine transform coefficients F'(u, v) subjected to scaling are inputted into a small-base inverse discrete cosine transformer 54. In the small-base inverse discrete cosine transformer 54, the discrete cosine transform coefficients F' (u, v) are inversely transformed by inverse discrete cosine transform of a smaller base of base size N/$2^{p1}$ and N/$2^{p2}$ in horizontal and vertical directions, respectively, than that of the conventional transform, and pictures f'(i, j) are outputted.

The pictures f'(i, j) are inputted into a resolution converter 55 in which the resolution of the picture is converted into a spatial resolution of a picture in same size at the encoding side and outputted as f(x, y). To convert spatial resolution from resolution of f'(i, j) to that of f(x, y), an interpolation method or a simple interpolation method can be utilized.

At p1=p2=1, for example, the following conversion can be made according to the interpolation method as shown in formulas (17) to (20):

$$f(x, y)=f(2i, 2j)=f'(i, j) \quad (17)$$

$$f(x, y)=f(2i+1, 2j)=(f'(i, j)+f'(i+1, j))/2 \quad (18)$$

$$f(x, y)=f(2i, 2j+1)=(f'(i, j)+f'(i, j+1))/2 \quad (19)$$

$$f(x, y)=f(2i+1, 2j+1)=(f'(i, j)+f'(i+1, j)+f'(i, j+1)+f'(i+1, j+1))/4 \quad (20)$$

where x, y=0, 1, 2, . . . , N−1.

In addition, the following conversion can be made according to the simple interpolation method as shown in formulas (21) to (24):

$$f(x, y)=f(2i, 2j)=f'(i, j) \quad (21)$$

$$f(x, y)=f(2i+1, 2j)=f'(i, j) \quad (22)$$

$$f(x, y)=f(2i, 2j+1)=f'(i, j) \quad (23)$$

$$f(x, y)=f(2i+1, 2j+1)=f'(i, j) \quad (24)$$

Meanwhile, the motion vector information b decoded by the variable length decoder 51 is inputted into the motion compensation predictor 57. The motion compensation predictor 57 loads corresponding picture information from the frame memory 58 in accordance with the inputted motion vector information b and outputs a motion compensation predictive picture c(x, y).

Further, the encode mode information c decoded by the variable length decoder 51 controls the switching means 59. If the encode mode is an intra-plane encode mode, the switching means 59 is turned off, nothing is added to the outputs f(x, y) from the resolution converter 55 by an adder 56, and the outputs r(x, y) are outputted as they are and stored in the frame memory 58 at the same time.

Meanwhile, if the encode mode is a mode other than the intra-plane encode mode, the switching means 59 is turned on, and the motion compensation predictive picture c(x, y) is added to the outputs f(x, y) from the resolution converter 55 by the adder 56 and the results are outputted as decoded picture outputs r(x, y) and stored in the frame memory 58 at the same time.

As stated above, according to this embodiment, the small-base inverse discrete cosine transformer 54 performs inverse discrete cosine transform using the base size of N/$2^{p1}$ and N/$2^{p2}$ in horizontal and vertical directions, respectively, scaled by the scaling unit 53. Thus, it is possible to greatly improve a processing speed compared with the conventional speed.

Next, the sixth embodiment of the present invention will be described with reference to FIG. 14. In this embodiment, data is decoded using a low-pass filter processing and a non-zero coefficient inverse discrete cosine transform processing.

Compressed video data is first inputted into a variable length decoder 51. Since the operation of the variable length decoder 51 and that of an inverse quantizer 52 are the same as or equivalent to those in the preceding fifth embodiment, no description will be given thereto. Discrete cosine transform coefficients F(u, v) outputted from the inverse quantizer 52 are inputted into a low-pass filter 61, which filter filters coefficient data.

Filtering can be realized by leaving only low range coefficients among the discrete cosine transform coefficients F(u, v) of N×N in size. If it is assumed that coefficients which have been subjected to low-pass filtering are F'(u, v), it is possible to utilize filtering as shown in the following formulas (25) and (26):

At $0 \leq u \leq b1$ and $0 \leq v \leq b2$, $F'(u, v) = F(u, v)$ (25)

At $u > b1$ or $v > b2$, $F'(u, v) = 0$ (26)

In the formulas, u, v=0, 1, 2, . . . , N−1. Symbols b1 and b2 are filtering parameters which are integers equal to or lower than N.

Also, it is possible to use the following formulas (27) and (28) to carry out filtering:

At $b2u + b1v \leq b1b2$, $F'(u, v) = F(u, v)$ (27)

At $b2u + b1v > b1b2$, $F'(u, v) = 0$ (28)

The discrete cosine transform coefficients F'(u, v) which have been subjected to low-pass filtering are inputted into a non-zero coefficient inverse discrete cosine transformer 62 having the base of the same size as that of the encoding-side base. The non-zero coefficient inverse discrete cosine transformer 62 inversely transforms the discrete cosine transform coefficients F'(u, v) and outputs pictures f(x, y). Here, x, y=0, 1, 2, . . . , N−1.

Further, the base of the non-zero coefficient inverse discrete cosine transformer 62 has the same size N×N as that of the encoding-side discrete cosine transform and the transformer 62 performs inverse discrete cosine transform according to formulas (29) and (30) shown in FIG. 23 while using coefficients not more than b1 and b2 for u and v, respectively. While the base of the non-zero coefficient inverse discrete cosine transformer 62 has the same size as that of the encoding-side base, a large quantity of F'(u, v)=0 data exist as a result of the filtering conducted by the low-pass filter 61. Due to this, the processing speed of the non-zero coefficient inverse discrete cosine transformer 62 greatly improves.

Figure 15:
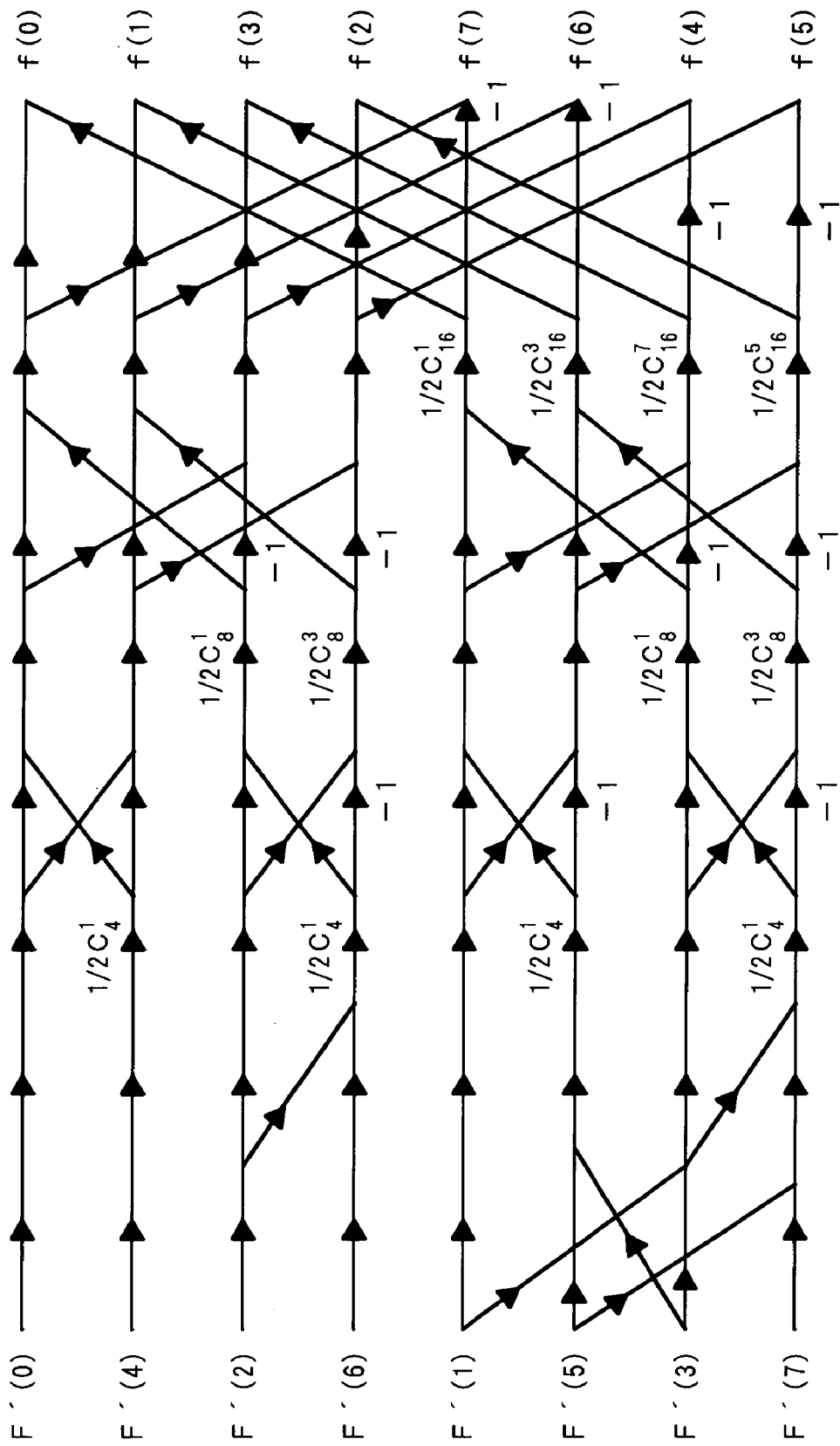
FIG. 15 is an explanatory view showing one example of high-speed inverse discrete cosine transform using butterfly operation.

Instead of the inverse discrete cosine transform using the above-stated formulas (29) and (30), butterfly operation may be used. FIG. 15 shows one example of high-speed inverse discrete cosine transform using conventional butterfly operation, i.e., butterfly operation while the filtering is not conducted, and shows a high-speed inverse discrete cosine transform processing as described in B. G. Lee, "A new algorithm to compute the discrete cosine transform", IEEE Trans-Acoust., Speech, and Signal Processing, vol. ASSP-32, pp. 1243-1245, Dec. 1984. FIG. 15 shows an inverse discrete cosine transform processing for a one-dimensional signal while N is 8. It is noted that symbols in FIG. 15 signify a formula (31) shown in FIG. 23. According to the processing of FIG. 15, an inverse discrete cosine transform processing is conducted to eight inputs of F'(0), F'(1), . . . , F'(7) and eight picture outputs of f(0), f(1), . . . , f(7) are obtained.

Figure 16:
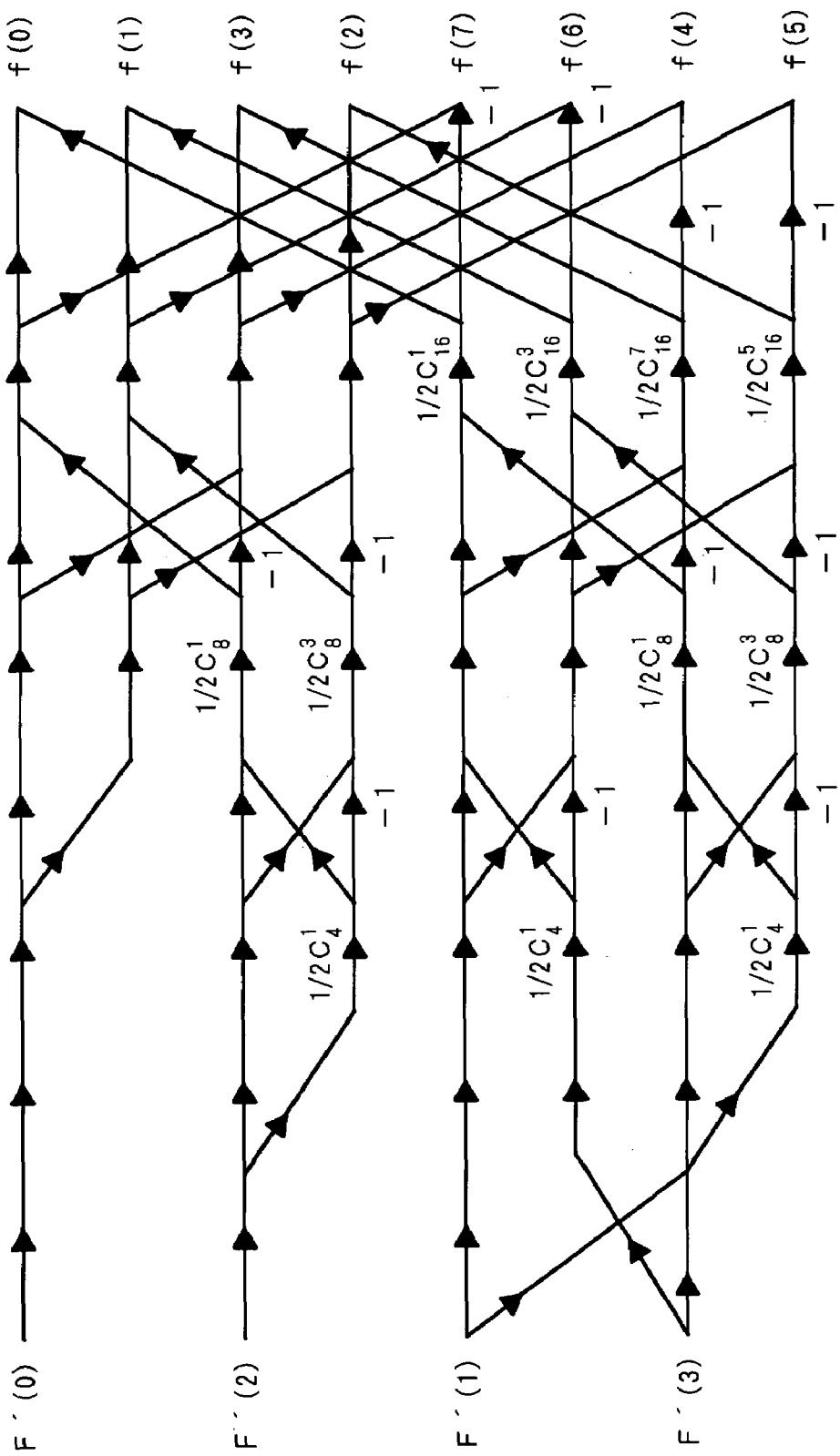
FIG. 16 is an explanatory view for the butterfly operation applied to the sixth embodiment according to the present invention.

However, after conducting filtering in this embodiment, the butterfly operation becomes what is shown in FIG. 16. FIG. 16 shows non-zero coefficient inverse discrete cosine transform by means of butterfly operation if a filtering parameter b1 is 4(b1=4). In this embodiment, only the four inputs of F'(0) to F'(3) are inputted and an inverse discrete cosine transform processing is conducted, with the result that eight picture data of f(0), f(1), . . . , f(7) are decoded. In this way, compared with the conventional inverse discrete cosine transform using N inputs, this embodiment suffices to conduct only inverse discrete cosine transform calculations corresponding to b points in a low range which are not zero, thereby greatly improving a processing speed.

The motion vector information decoded by the variable length decoder 51 is inputted into a motion compensation predictor 57 as in the case of the fifth embodiment. The motion vector predictor 57 loads corresponding picture information from the frame memory 58 according to the inputted motion vector information and outputs a motion compensation predictive picture c(x, y).

Also, encode mode information decoded by the variable length decoder 51 controls switching means 59 as in the case of the fifth embodiment. If the encode mode is an intra-plane encode mode, the switching means 59 is turned off, nothing is added to outputs f(x, y) from an inverse discrete cosine transformer 62 by an adder 56, and the results are outputted as decoded picture outputs r(x, y) as they are and stored in a frame memory 58 at the same time.

Meanwhile, if the encode mode is a mode other than the intra-plane encode mode, the switching means 59 is turned on, a motion vector predictive picture c(x, y) is added to outputs f(x, y) from the non-zero coefficient inverse discrete cosine transformer 62 by the adder 56 and the outputs c(x, y) are outputted as decoded picture outputs r(x, y) and stored in the frame memory 58 at the same time.

As stated above, according to this embodiment, the base of the non-zero coefficient inverse discrete cosine transformer 62 is the same in size as encoding-side discrete cosine transform. However, since a large quantity of data F'(u, v)=0 exist as a result of filtering conducted by the low-pass filter 61, the substantial processing quantity of the non-zero inverse discrete cosine transformer 62 is greatly reduced and a processing speed thereby greatly improves.

Figure 17:
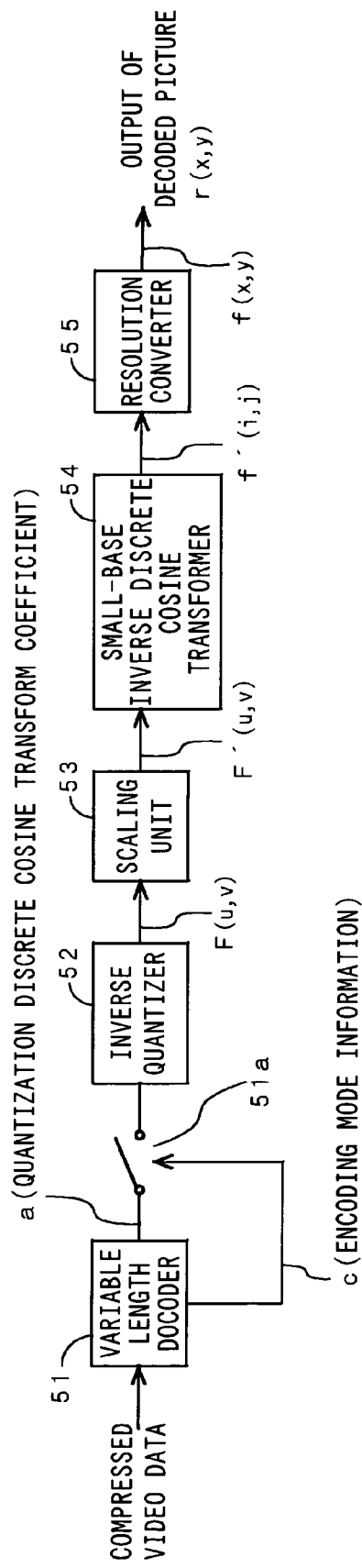
FIG. 17 is a block diagram showing the constitution of the seventh embodiment according to the present invention.

Next, the seventh embodiment will be described with reference to FIG. 17. In this embodiment, a processing speed in a conventional method for decoding only pictures encoded in an intra-plane encode mode and not decoding pictures encoded in modes other than the intra-plane encode mode, is further improved.

Compressed video data is inputted into a variable length decoder 51. The variable length decoder 51 decodes an encode mode such as quantization discrete cosine transform coefficients a, encode mode information c and the like. When the encode mode is an intra-plane encode mode, switching means 51a is closed and the quantization discrete cosine transform coefficients a are outputted to an inverse quantizer 52 from the variable length decoder 51. The quantization discrete cosine transform coefficients a inputted into the inverse quantizer 52 are dequantized and discrete cosine transform coefficients F(u, v) are outputted. The discrete cosine transform coefficients F(u, v) are inputted into a scaling unit 53 which scales coefficient data.

With a scaling method, the respective discrete cosine transform coefficients are changed according to a formula given as the formula (15). Further, to simplify the method, scaling as shown in the formula (16) can be utilized.

The discrete cosine transform coefficients F'(u, v) which have been scaled are inputted into a small-base inverse discrete cosine transformer 54. In the small-base inverse discrete cosine transformer 54, the discrete cosine transform coefficients F'(u, v) are inversely transformed by inverse discrete cosine transform with a base size of $N/2^{p1}$ and $N/2^{p2}$ in horizontal and vertical directions, respectively and pictures f'(i, j) are outputted. The pictures f' (i, j) are inputted into a resolution converter 55, the resolution of the pictures are converted into a spatial resolution which is the same in size as encoding-side resolution and outputted as f(x, y). As a spatial resolution converting method of converting the resolution of f'(i, j) into that of f(x, y), the interpolation method or the simple interpolation method as used in the fifth embodiment can be used.

The outputs f(x, y) from the resolution converter 55 are outputted as decoded picture outputs r(x, y) as they are.

According to this embodiment, it is possible to greatly improve a processing speed for processing a picture encoded in an intra code mode.

Figure 18:
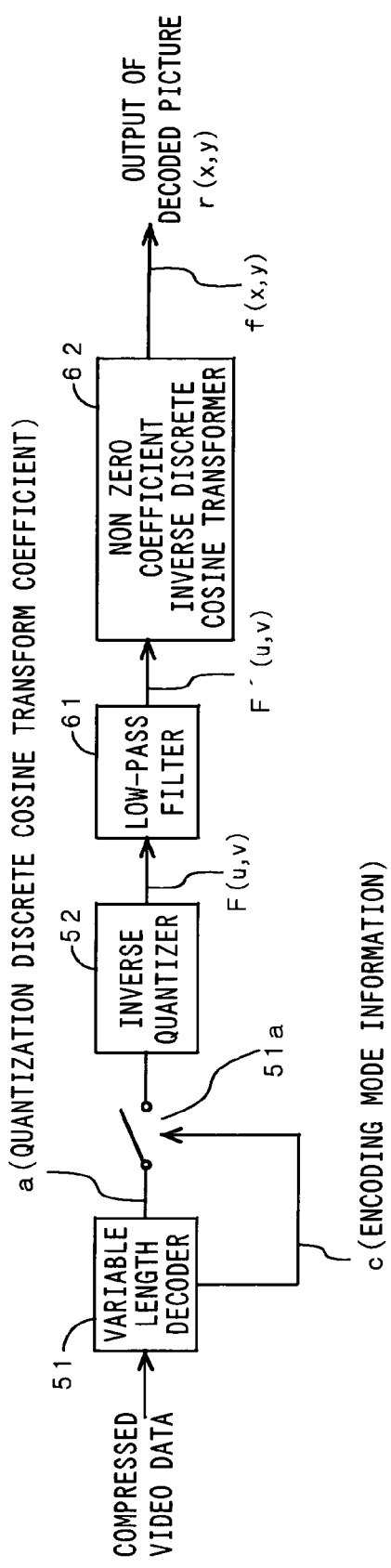
FIG. 18 is a block diagram showing the constitution of the eighth embodiment according to the present invention.

Next, the eighth embodiment of the present invention will be described with reference to FIG. 18. As in the case of the preceding seventh embodiment, a processing speed for processing a picture encoded in an intra code mode in this embodiment is improved.

Compressed video data is inputted into a variable length decoder 51. The variable length decoder 51 decodes an encode mode such as quantization discrete cosine transform coefficients a, encode mode information c and the like. When the encode mode is an intra code mode, switching means 51a is closed and the quantization discrete cosine transform coefficients a are outputted from the variable length decoder 51 to an inverse quantizer 52. The quantization discrete cosine transform coefficients a inputted into the inverse quantizer 52 are dequantized and discrete cosine transform coefficients F(u, v) are outputted. The discrete cosine transform coefficients F(u, v) are inputted into a low-pass filter 61 and coefficient data is filtered therein.

As a filtering method, while coefficients which have been subjected to low-pass filtering are assumed as F'(u, v), filtering using the formulas (25) and (26) can be utilized. Alternatively, filtering using the formulas (27) and (28) can be utilized. By filtering the coefficients, it is possible to leave only coefficients in a low range among the discrete cosine transform coefficients F(u, v) of N×N in size.

The discrete cosine transform coefficients F'(u, v) which have been subjected to low-pass filtering are inputted into a non-zero coefficient inverse discrete cosine transformer 62. The base of this non-zero coefficient inverse discrete cosine transformer 62 has the same size N×N as that of the encoding-side base. In the transformer 62, inverse discrete cosine transform is performed by the formulas (29) and (30) with coefficients not more than b1 and b2 used for u and v, respectively. Alternatively, as in the case of the sixth embodiment, the butterfly operation shown in FIG. 16 may be utilized.

The discrete cosine transform coefficients F'(u, v) are inversely transformed by the non-zero coefficient inverse discrete cosine transformer 62 and pictures f(x, y) are outputted. Here, x and y satisfy x, y=0, 1, 2, . . . , N−1. The outputs f(x, y) from the inverse discrete cosine transformer 62 are outputted as decoded picture outputs r(x, y) as they are.

According to this embodiment, as in the case of the seventh embodiment, it is possible to greatly improve a processing speed for processing a picture encoded in an intra code mode.

Figure 19:
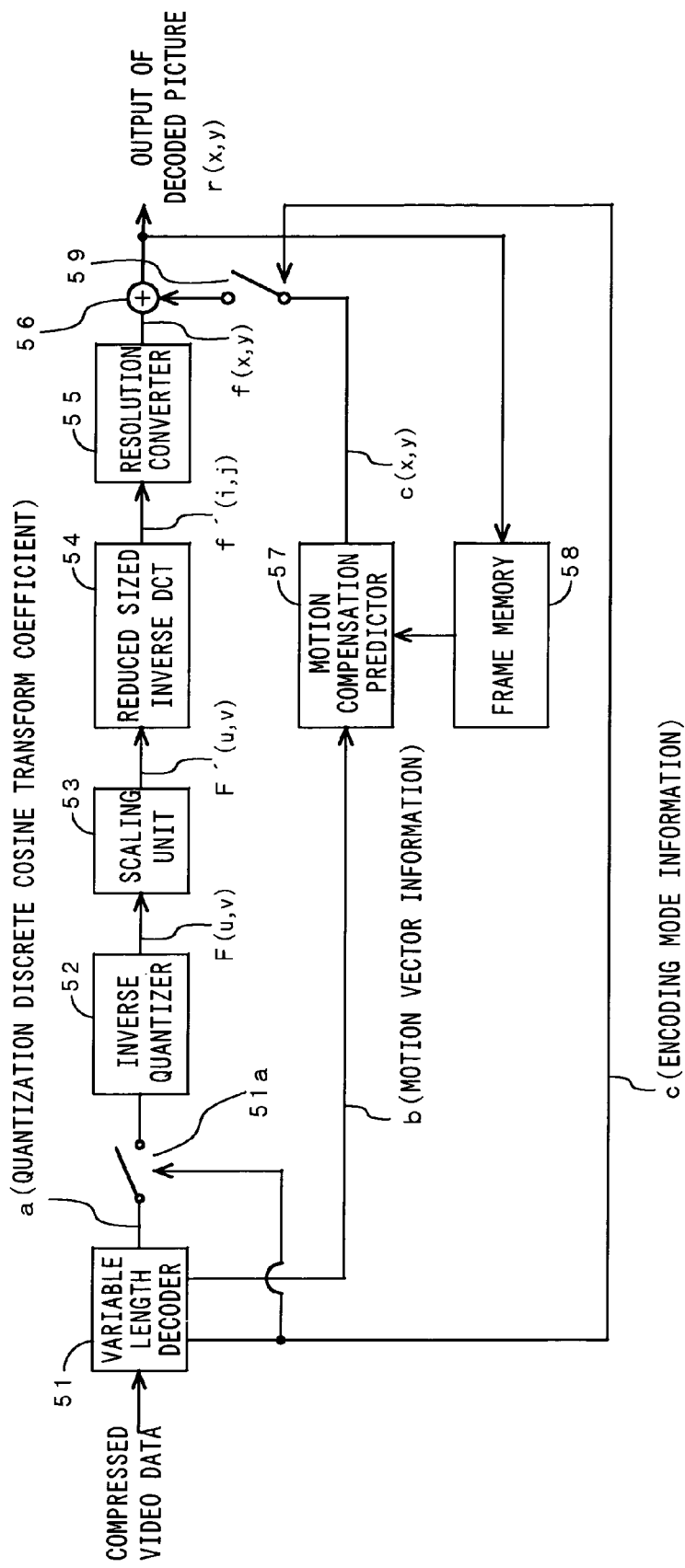
FIG. 19 is a block diagram showing the constitution of the ninth embodiment according to the present invention.

Next, the ninth embodiment of the present invention will be described with reference to FIG. 19. In FIG. 19, reference symbol 51a denotes switching means and the remaining reference symbols denote the same or equivalent constituent elements as or to those shown in FIG. 13. In this embodiment, a processing speed for decoding a picture which has been subjected to intra coding and one-way predictive encoding is improved.

Compressed video data is inputted in to a variable length decoder 51. The variable length decoder 51 decodes quantization discrete cosine transform coefficients a, motion vector information b, encode mode information c and the like. The encode mode information c controls the switching means 51a and 59.

The encode mode information c turns on the switching means 51a when an encode mode is an intra code mode or a one-way predictive encode plane mode. When the encode mode is the intra code mode, the switch 59 is turned off. When the encode mode is the one-way predictive encode plane mode, the switch 59 is turned on. When the encode mode is a mode other than these encode modes, the switching means 51a is turned off. As a result, the quantization discrete cosine transform coefficients a are inputted into an inverse quantizer 52 when the encode mode is the intra code mode or the one-way predictive encode plane mode and decoded picture outputs r(x, y) are finally obtained by the same operation as that described in the fifth embodiment.

According to this embodiment, only intra coded pictures and one-way predictive encoded pictures are decoded while the other pictures are not decoded. It is, therefore, possible to not only improve a decoding speed due to this thinning-out operation but also improve the processing speed of a small-base inverse discrete cosine transformer 54 described in the fifth embodiment. Thus, the improvement of the processing speed is superior to that in the fifth embodiment.

Figure 20:
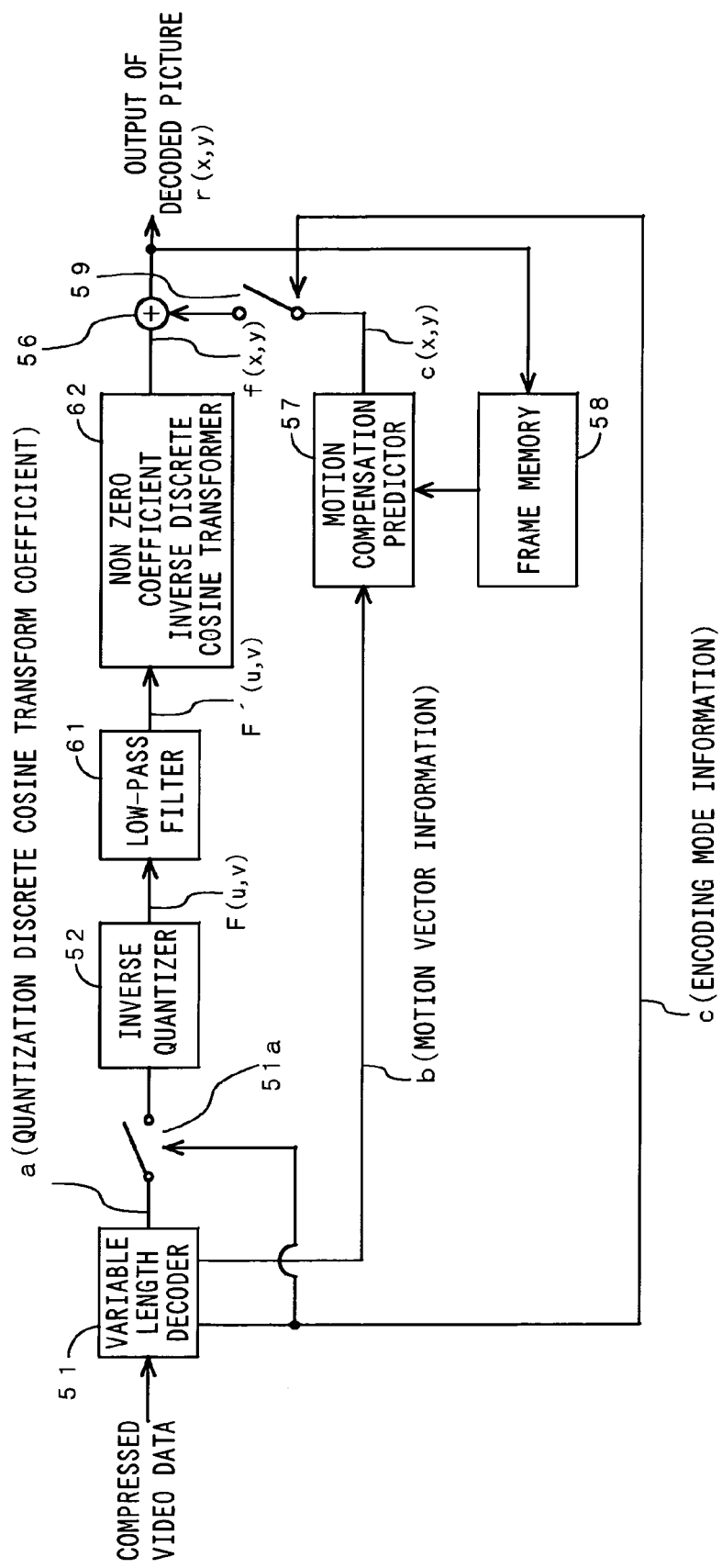
FIG. 20 is a block diagram showing the constitution of the tenth embodiment according to the present invention.

Next, the tenth embodiment of the present invention will be described with reference to FIG. 20. In FIG. 20, reference symbol 51a denotes switching means and the other reference symbols denote the same or equivalent constituent elements as or to those in FIG. 13. In this embodiment, a processing speed for decoding a picture which has been subjected to intra coding and one-way predictive encoding is improved.

Compressed video data is inputted into a variable length decoder 51. The variable length decoder 51 decodes quantization discrete cosine transform coefficients a, motion vector information b, encode mode information c and the like. The encode mode information c controls the operation of the switching means 51a and 59.

The encode mode information c turns on the switching means 51a when an encode mode is an intra code mode or a one-way predictive encode plane mode. In the intra code mode, the switch 59 is turned off and in the one-way predictive encode plane mode, the switch 59 is turned on. Further, in modes other than these encode modes, the switching means 51a is turned off. As a result, when the encode mode is the intra code mode or the one-way predictive encode picture mode, the quantization discrete cosine transform coefficients a are inputted into an inverse quantizer 52 and decoded picture outputs r(x, y) are finally obtained by the same operation as that described in the sixth embodiment.

According to this embodiment, as in the case of the ninth embodiment, it is possible to improve a decoding speed for decoding a picture which has been subjected to intra coding and one-way predictive encoding.

Figure 21:
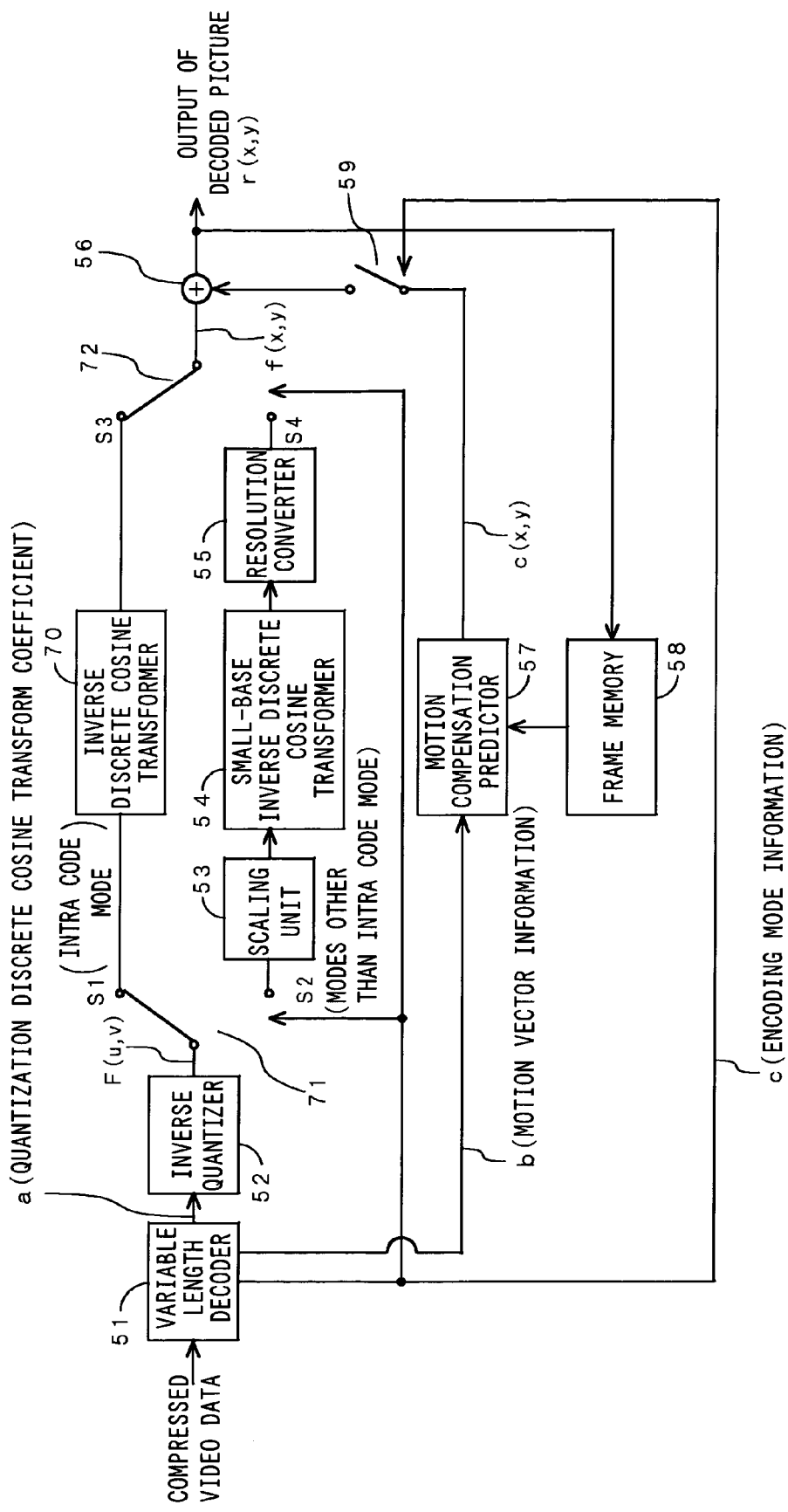
FIG. 21 is a block diagram showing the constitution of the eleventh embodiment according to the present invention.

Next, the eleventh embodiment of the present invention will be described with reference to FIG. 21. In FIG. 21, reference symbol 70 denotes an inverse discrete cosine transformer, reference symbols 71 and 72 denote switches and the remaining reference symbols denote the same or equivalent constituent elements as or to those in FIG. 13, respectively. In this embodiment, an intra coded picture forms a basis for decoding of pictures encoded in other modes. Due to this, the intra coded picture is decoded in a complete fashion to thereby improve a decoding speed for decoding a picture encoded in a mode other than the intra code mode.

Compressed video data is inputted into a variable length decoder 51. The variable length decoder 51 decodes quantization discrete cosine transform coefficients a, motion vector information b, encode mode information c and the like.

The quantization discrete cosine transform coefficients a are inputted into an inverse quantizer 52 and the motion vector information is inputted into a motion compensation predictor 57. The quantization discrete cosine transform coefficients a inputted into the inverse quantizer 52 are dequantized and discrete cosine transform coefficients F(u, v) are outputted.

When an encode mode is an intra code mode, the switch 71 is connected to a terminal s1, the switch 72 is connected to a terminal s3, the switch 59 is turned off and the quantization discrete cosine transform coefficients a are inputted into an inverse discrete cosine transformer 70. The inverse discrete cosine transformer 70 performs inverse discrete cosine transform by the same base size N×N as that of the encoding-side base and outputs f(x, y), which are outputted as decoded picture outputs r(x, y) as they are and also stored in a frame memory 58.

Meanwhile, when the encode mode is a mode other than the intra code mode, the switch 71 is connected to a terminal s2, the switch 72 is connected to a terminal s4, the switch 59 is turned on, and the discrete cosine transform coefficients are inputted into a scaling unit 53 which scales coefficient data. Discrete cosine transform coefficients F'(u, v) which have been subjected to scaling are inputted into a small-base inverse discrete cosine transformer 54, the outputs of which are inputted into a resolution converter 55. Since the operations of the scaling unit 53, the small-base inverse discrete cosine transformer 54, the resolution converter 55 and the remaining constituent elements are the same as those in the fifth embodiment, description will not be given thereto.

According to this embodiment, it is possible to simultaneously realize the improvement of the picture quality of a decoded picture and the improvement of a decoding processing speed.

Next, the twelfth embodiment of the present invention will be described with reference to FIG. 22. In FIG. 22, reference symbol 80 denotes an inverse discrete cosine transformer, reference symbols 81 and 82 denote switches and the remaining reference symbols denotes the same or equivalent constituent elements as or to those shown in FIG. 14, respectively. In this embodiment, as in the case of the eleventh embodiment, the intra coded picture is decoded in a complete fashion and a decoding speed for decoding a picture encoded in the other mode is improved.

In this embodiment, when an encode mode is an intra code mode, the switch 81 is connected to a terminal s1, the switch 82 is connected to a terminal s3, the switch 59 is turned off and quantization discrete cosine transform coefficients a are inputted into an inverse discrete cosine transformer 80. The inverse discrete cosine transformer 80 performs inverse discrete cosine transform by the same base size N×N as that at the encoding-side base and outputs f(x, y), which are outputted as decoded picture outputs r(x, y) as they are and also stored in a frame memory 58.

Meanwhile, when the encode mode is a mode other than the intra code mode, the switch 81 is connected to a terminal s2, the switch 82 is connected to a terminal s4, the switch 59 is turned on, and the discrete cosine transform coefficients F(u, v) are inputted into a low-pass filter 61 which filters coefficient data. The filtered data is then inputted into a non-zero coefficient inverse discrete cosine transformer 62. Since the operations of the low-pass filter 61, the non-zero coefficient inverse discrete cosine transformer 62 and the remaining constituent elements are the same as those in the sixth embodiment, description will not be given thereto.

According to this embodiment, as in the case of the eleventh embodiment, it is possible to simultaneously realize the improvement of the picture quality of a decoded picture and the improvement of a decoding processing speed.

Next, the functions of the decoding apparatus in above-stated embodiments can be realized by software (program), which software can be recorded on a portable type recording medium such as an optical disk, a floppy disk or a hard disk.

Figure 24A:
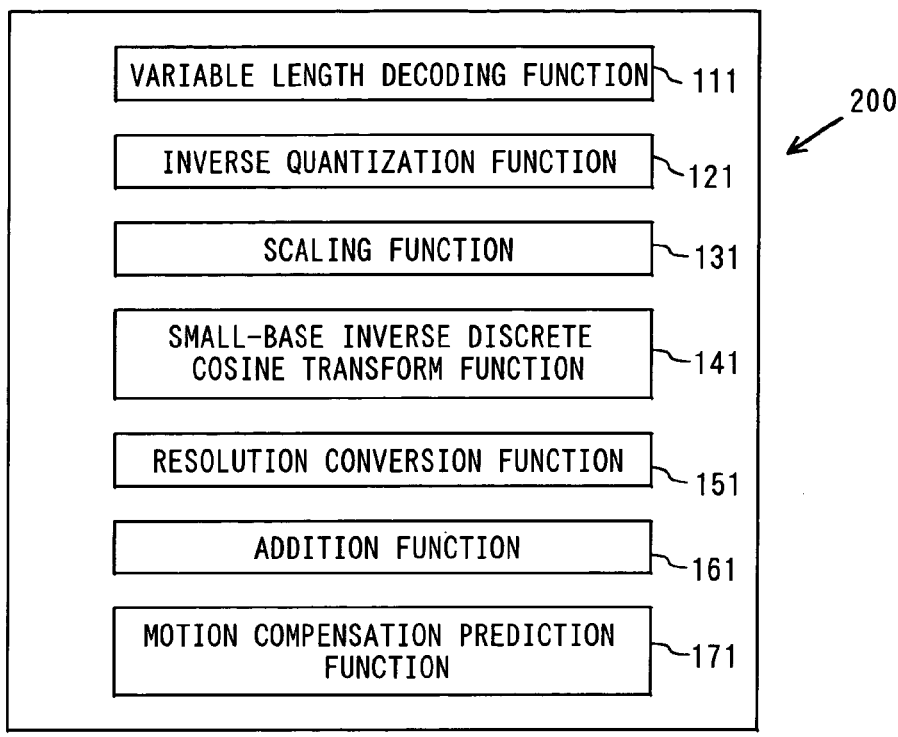
FIG. 24 shows the outline of a program stored on a storage medium.
Figure 24B:
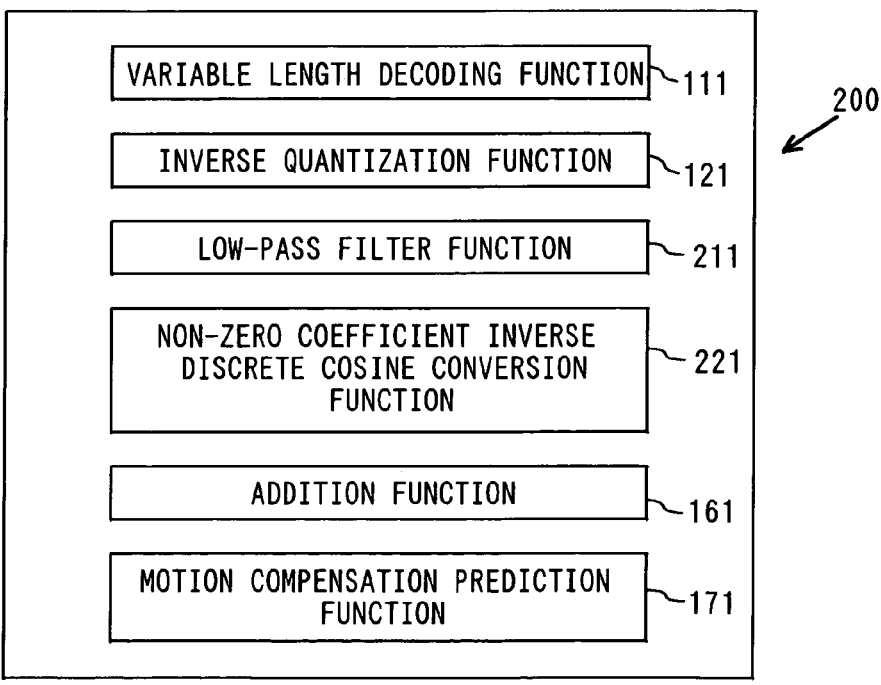
Figure 25:
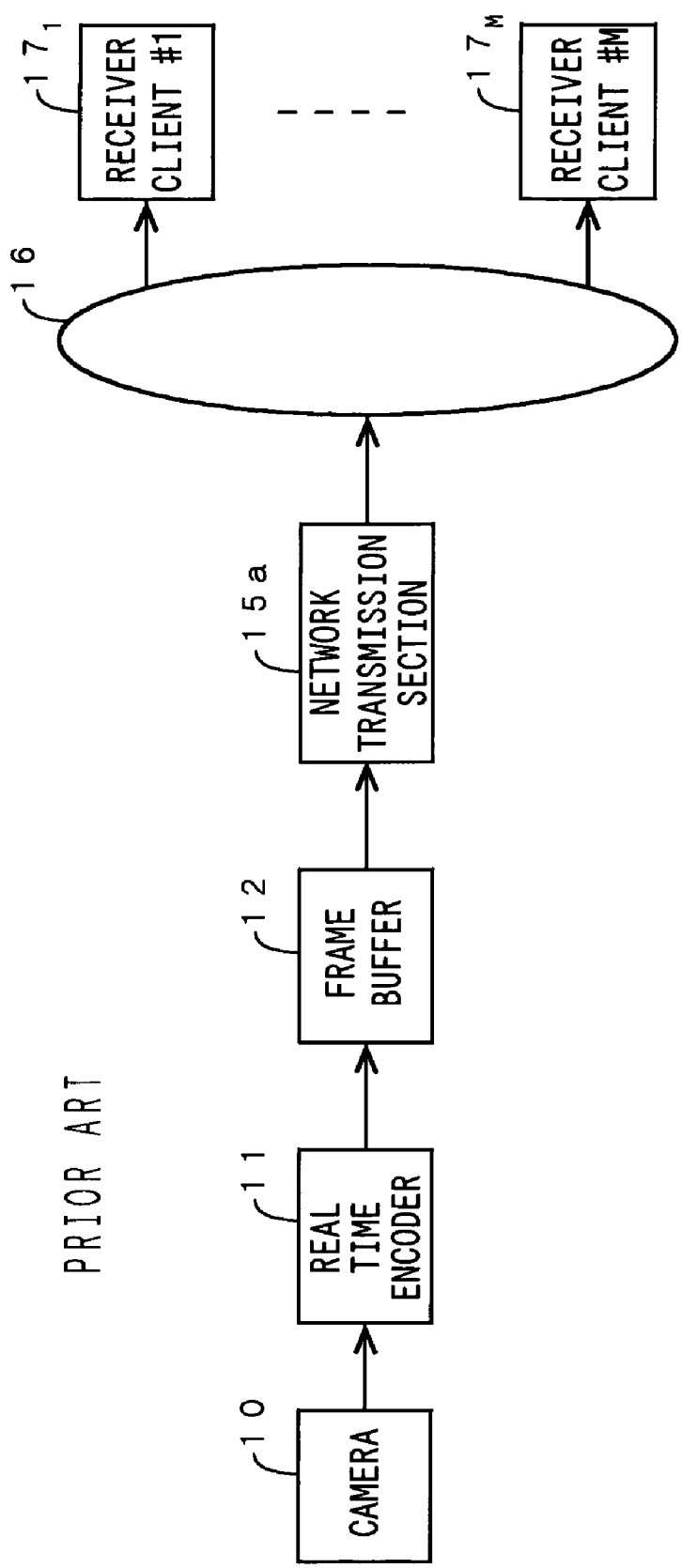
FIG. 25 is a block diagram showing an example of a conventional transmission apparatus based on a direct transmission method.
Figure 26:
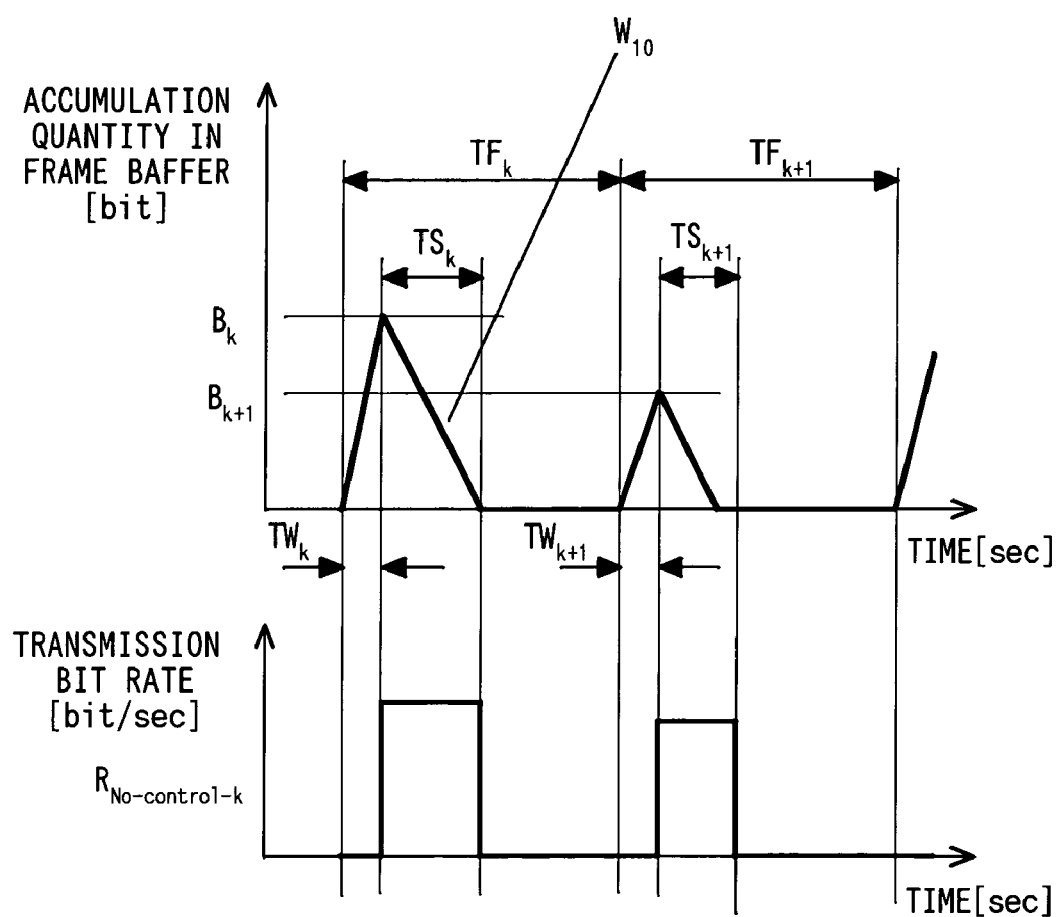
FIG. 26 is a time chart for describing a frame buffer storage concept in the conventional transmission apparatus based on the direct transmission method.
Figure 27:
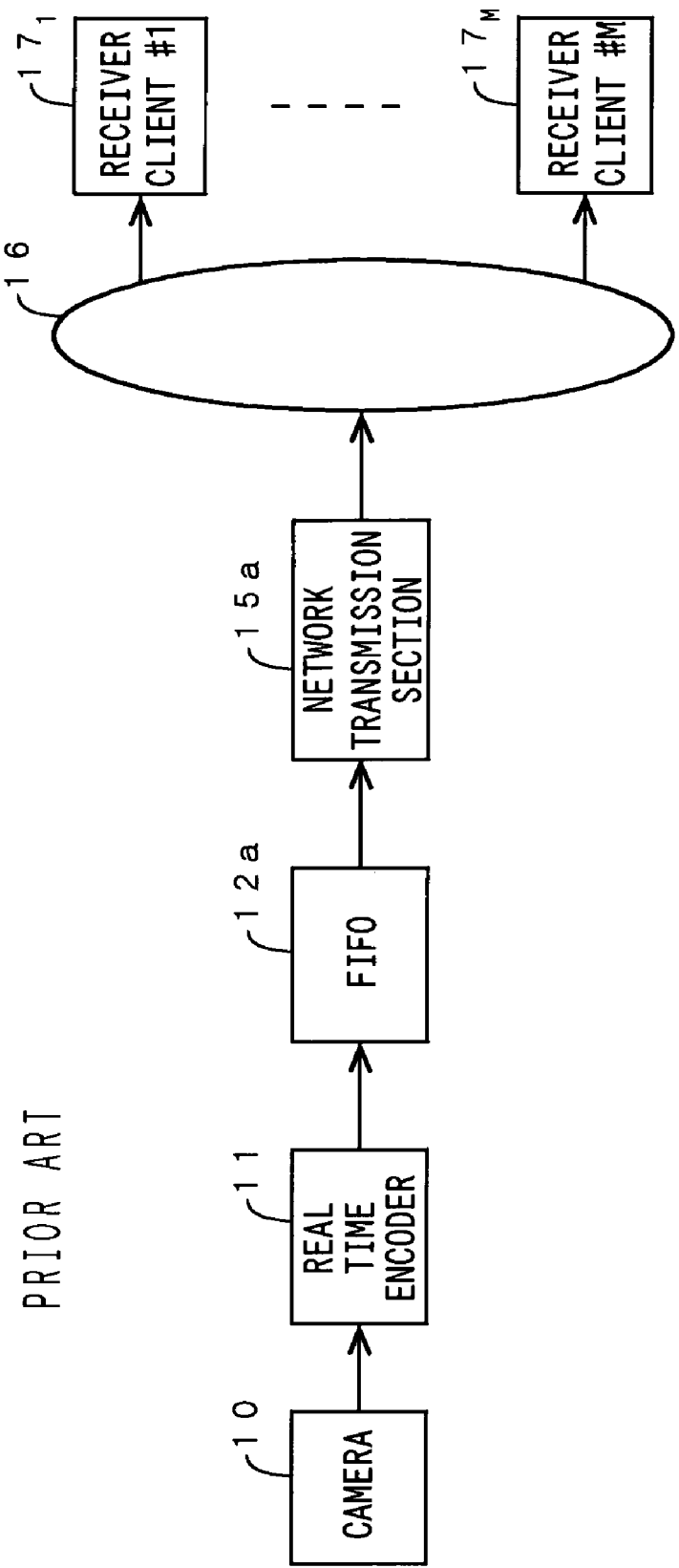
FIG. 27 is a block diagram showing an example of a conventional transmission apparatus based on an FIFO method.
Figure 28:
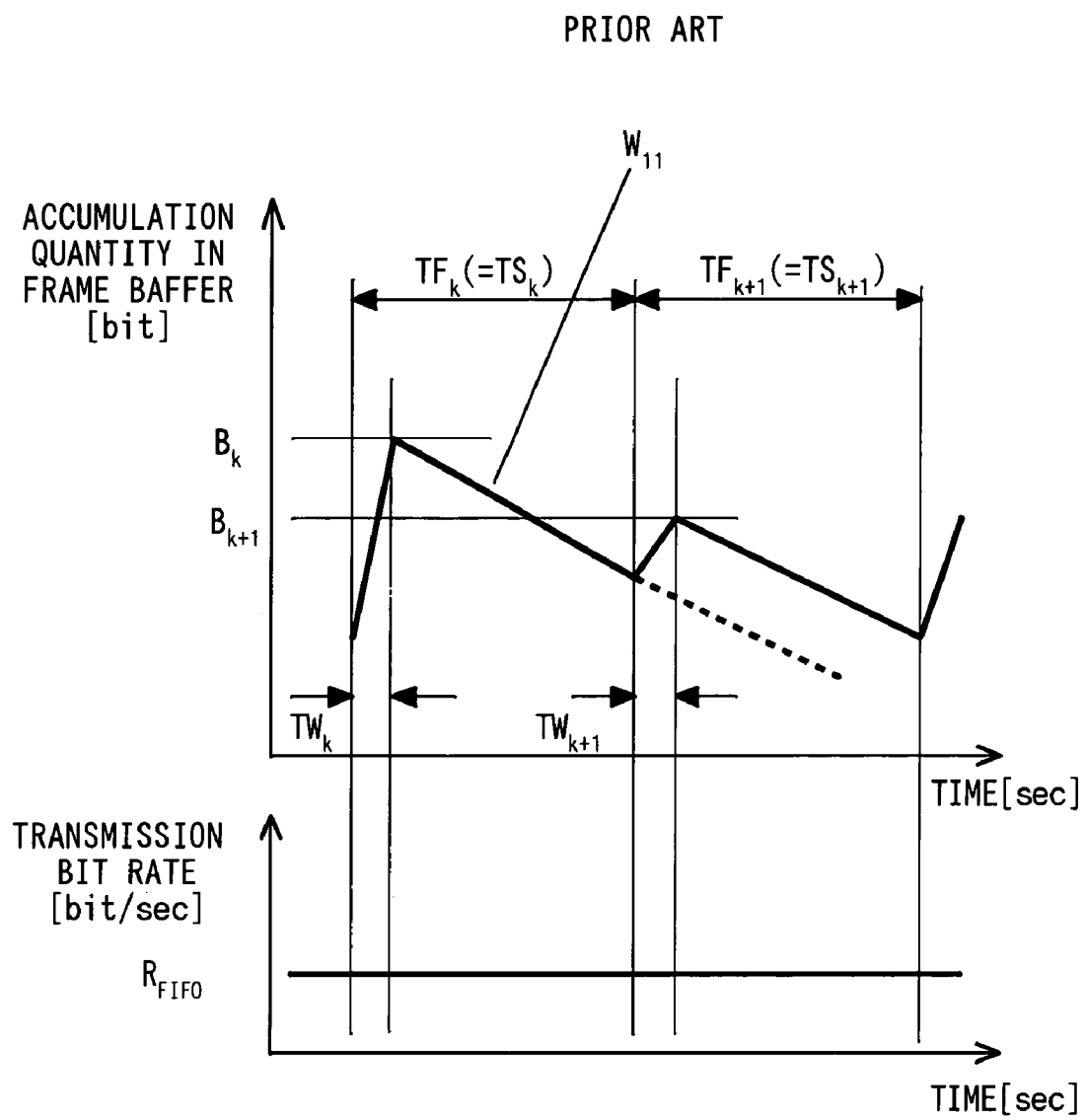
FIG. 28 is a time chart for describing a frame buffer storage concept in the conventional transmission apparatus based on the FIFO method.

FIG. 24 shows one example of a program stored on the storage medium. FIG. 24A shows the contents of the storage medium executing the functions of the decoding apparatus in the embodiment in FIG. 13, whereas FIG. 24B shows the contents of the storage medium executing the functions of the decoding apparatus in the embodiment in FIG. 14.

A storage medium 200 shown in FIG. 24A stores thereon a decoding program of a variable length decoding function 111, an inverse quantization function 121, a scaling function 131, a small-base inverse discrete cosine transform function 141, a resolution conversion function 151, an addition function 161 and a motion compensation prediction function 171.

A storage medium 200 shown in FIG. 24B stores thereon a decoding program of a variable length decoding function 111, an inverse quantization function 121, a low-pass filter function 211, a non-zero coefficient inverse discrete cosine conversion function 221, an addition function 161 and a motion compensation prediction function 171. It is noted that functions recorded on the recording medium may not be all the functions described above but only important functions among them.

FIG. 12 is a block diagram showing the hardware configuration of a computer which reads the decoding program recorded on the portable type storage medium and executes the decoding function. The computer 100 consists of a storage medium 200 on which the above-stated decoded program is recorded, a reader 105 reading the decoding program from the storage medium 200, a CPU 101 executing the decoding program, an ROM 103 storing various data, an RAM 104 storing operation parameters and the like, an input device 102 such as a keyboard or a mouse, an output device 102 such as a display or a printer, and a bus 106 connecting the respective constituent elements of the computer 100.

The CPU 101 reads the decoding processing program recorded on the storage medium 200 through the reader 105 and then executes the decoding processing program, thereby executing the above-stated decoding processing. As a frame memory 58 used to execute the decoding processing program, part of the region of the RAM 104 or part of the region of a hard disk which is not shown in FIG. 12 can be utilized. It is noted that the storage medium 200 also includes a transmission medium for temporarily recording and storing data such as a network.

Further, the compressed video data thus decoded may be stored in a memory such as the hard disk in advance or captured into the computer 100 from a network which is not shown in FIG. 12.

As is obvious from the above-stated description, the apparatus, the method and the storage medium according to the present invention can obtain the following advantages:

(1) It is possible to efficiently transmit picture information while suppressing the generation of packet loss by smoothing packet transmission without the need to employ FIFO requiring overflow and underflow control and without the need to start another process for network output.

(2) In case of multi-channel transmission, it is possible to transmit only filtered picture information even if a network band in the middle of transmission is narrower.

(3) Even if a transmission network band constantly or temporarily exceeds a stream band to make it difficult to compression-transmit live picture information, it is possible to compression-transmit live information from information fed back to the encoder by reducing an encoding bit rate.

(4) It is possible to compression-transmit picture information on a plurality of channels efficiently in a real time manner by smoothing packet transmission for each channel and by conducting transmission timing control so as to minimize the sum of packet loss rates of the channels.

(5)-Since decoding processing is conducted using an inverse discrete cosine transform of small-base size, the low-pass filter of discrete cosine transform coefficients and non-zero coefficient inverse discrete cosine transform, it is possible to decode a compressed video data at higher speed than the conventional speed. Besides, it is possible to provide a storage medium storing program allowing high-speed compressed video data decoding processing.

What is claimed is:

1. A real-time picture information compression-transmission apparatus for compression transmitting picture information in a real-time manner, comprising:

input means for receiving said picture information;

an encoder encoding frames of said picture information from the input means on a preset cycle in a real-time manner and outputting real-time-encoded data corresponding to respective frames of said picture information;

storage means for storing said real-time-encoded data corresponding to the respective frames of said picture information output from the encoder, the encoder writing the real-time-encoded data corresponding to the respective frames into the storage means;

division means for receiving the real-time encoded data corresponding to respective frames from the storage means and sequentially dividing said real-time-encoded data corresponding to the respective frames into packets; and transmission timing control and transmission means for controlling transmission timing to sequentially transmit the packets corresponding to the respective frames to a network, wherein packets corresponding to respective frames are transmitted sequentially to the network during an entire period between when said encoder ends writing real-time encoded data corresponding to a frame to the storage means and when said encoder begins writing real-time encoded data corresponding to a next frame to the storage means, and for transmitting the packets to the network according to a connection-less type protocol.

2. A real-time picture information compression-transmission apparatus according to claim 1, wherein the division means for dividing the data corresponding to respective frames into the packets, divides said real-time-encoded data corresponding to respective frames into packets in size suited for an Ethernet maximum transfer unit; and the transmission timing for the transmitting the packets corresponding to respective frames to the network is determined from an encoded frame interval and a frame data storage time.

3. A real-time picture information compression-transmission apparatus according to claim 1, wherein the division means for dividing the real-time-encoded data corresponding to respective frames into the packets divides the respective frames so that:

a payload size of a transmitted UDP packet corresponds to a value obtained by subtracting an IP header size and a UDP header size from an Ethernet maximum transfer unit; and the number of UDP packets divided from a K-th frame corresponds to a value obtained by dividing a data size, in bytes, of the K-th frame by the payload size, in bytes, of the transmitted UDP packet; and the transmission timing, controlled by said transmission timing control and transmission means, for transmitting the packets to the network is set so that a transmission time, in seconds, for transmitting the K-th frame data to the network corresponds to a value obtained by subtracting a write time, in seconds, for which said encoder writes the K-th frame data into said storage means, from a frame interval, in seconds, between the K-th frame data and a (K+1)th frame data.

4. A real-time picture information compression-transmission apparatus according to claim 1, wherein if multi-channel transmission is conducted, the transmitted packets are further filtered using one of UDP port numbers and IP multi-cast addresses, whereby even if a network band in which the packets are being transmitted is narrowed, filtered picture information can be transmitted.

5. A real-time picture information compression-transmission apparatus according to claim 2, wherein if multi-channel transmission is conducted, the transmitted packets are further filtered using one of UDP port numbers and IP multi-cast addresses, whereby even if a network band in which the packets are being transmitted is narrowed, filtered picture information can be transmitted.

6. A real-time picture information compression-transmission apparatus according to claim 3, wherein if multi-channel transmission is conducted, the transmitted packets are further filtered using one of UDP port numbers and IP multi-cast addresses, whereby even if a network band in which the packets are being transmitted is narrowed, filtered picture information can be transmitted.

7. A real-time picture information compression-transmission method for compression-transmitting picture information in a real-time manner, comprising:

an encoding step of encoding said picture information on a preset cycle in a real time manner;

a storage step of writing and storing real-time-encoded frame data on said picture information for each frame;

a division step of sequentially dividing said real-time-encoded data into packets for each frame; and a transmission timing control and transmission step of controlling transmission timing to sequentially transmit the divided packets to a network during an entire period between when said storage step of writing and storing real-time encoded data for a frame ends and when said storage step of writing and storing real-time encoded data for a next frame begins, and of transmitting the packets to the network according to a connection-less type protocol.

8. A real-time picture information compression-transmission apparatus for compression transmitting picture information in a real-time manner, comprising: input means for receiving said picture information;
- an encoder encoding frames of said picture information from the input means on a preset cycle in a real-time manner and outputting real-time-encoded data corresponding to respective frames of said picture information;
- storage means for storing said real-time-encoded data corresponding to the respective frames of said picture information output from the encoder, the encoder writing the real-time-encoded data corresponding to the respective frames into the storage means;
- division means for receiving the real-time encoded data corresponding to respective frames from the storage means and sequentially dividing said real-time-encoded data corresponding to the respective frames into packets; and
- transmission timing control and transmission means for controlling transmission timing to sequentially transmit the packets corresponding to the respective frames to a network, wherein the transmission timing and control means controls transmission of packets corresponding to respective frames to the network based on a determination of a difference between a time between frames and a time during which the encoder writes frame data to the storage means, and for transmitting the packets to the network according to a connectionless type protocol.

* * * * *